US012784627B2

(12) United States Patent
Toyoda

(10) Patent No.: US 12,784,627 B2
(45) Date of Patent: Nov. 3, 2026

(54) DISPLAY DEVICE AND ELECTRONIC DEVICE

(71) Applicant: Sony Semiconductor Solutions Corporation, Kanagawa (JP)

(72) Inventor: Takashi Toyoda, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1 day.

(21) Appl. No.: 18/837,008

(22) PCT Filed: Jan. 26, 2023

(86) PCT No.: PCT/JP2023/002455
§ 371 (c)(1),
(2) Date: Feb. 27, 2025

(87) PCT Pub. No.: WO2023/176166
PCT Pub. Date: Sep. 21, 2023

(65) Prior Publication Data
US 2025/0384804 A1 Dec. 18, 2025

(30) Foreign Application Priority Data
Mar. 18, 2022 (JP) ................................ 2022-044628

(51) Int. Cl.
*G09G 5/10* (2006.01)
*G09G 3/20* (2006.01)

(52) U.S. Cl.
CPC ... *G09G 3/2003* (2013.01); *G09G 2300/0842* (2013.01); *G09G 2300/0852* (2013.01);
(Continued)

(58) Field of Classification Search
CPC ......... G09G 3/2003; G09G 2300/0842; G09G 2300/0852; G09G 2320/0626; G09G 2354/00; G09G 2380/10
(Continued)

(56) References Cited

U.S. PATENT DOCUMENTS 11,217,609 B1 * 1/2022 Gao ........................ H01L 22/32
2016/0267713 A1 9/2016 Patel
(Continued)

FOREIGN PATENT DOCUMENTS

CN 109637418 A 4/2019
CN 109891313 A 6/2019
(Continued)

OTHER PUBLICATIONS

International Search Report (PCT/ISA/210), International Application No. PCT/JP2023/002455, dated Mar. 28, 2023.

*Primary Examiner* — Jennifer T Nguyen
(74) *Attorney, Agent, or Firm* — Michael Best & Friedrich LLP

(57) ABSTRACT

To realize foveated rendering with low power consumption. A display device includes a plurality of pixels, a first signal line, a first circuit, a second signal line, a second circuit, a third signal line, a third circuit, and a switch. The plurality of pixels is arranged in a two-dimensional array of lines and columns. The first signal line extends along a direction of the line and is connected to the plurality of pixels belonging to the line. The first circuit is connected to the first signal line. The second signal line extends along a direction of the column and is connected to the plurality of pixels belonging to the column. The second circuit is connected to the second signal line. The third signal line extends along a direction of the column and is connected to the plurality of pixels belonging to a column adjacent to the column to which the second signal line is connected. the third circuit is selec-
(Continued)

tively connected to the third signal line. the switch switches connection between one of the second signal line and the third circuit and the third signal line.

12 Claims, 30 Drawing Sheets

(52) U.S. Cl.
CPC . *G09G 2320/0626* (2013.01); *G09G 2354/00* (2013.01); *G09G 2380/10* (2013.01)

(58) Field of Classification Search
USPC .......................................................... 345/694
See application file for complete search history.

(56) References Cited

U.S. PATENT DOCUMENTS

| | | | | |
|---|---|---|---|---|
| 2016/0329014 | A1 | 11/2016 | Lee | |
| 2017/0309219 | A1* | 10/2017 | Kong | G09G 3/2003 |
| 2018/0261150 | A1* | 9/2018 | Tamura | G09G 3/2074 |
| 2019/0043410 | A1* | 2/2019 | Kitamura | G09G 3/3275 |
| 2019/0147786 | A1 | 5/2019 | Kim | |
| 2020/0242997 | A1 | 7/2020 | Xue | |
| 2023/0043411 | A1* | 2/2023 | Igarashi | G09G 3/3275 |

FOREIGN PATENT DOCUMENTS

| | | | |
|---|---|---|---|
| JP | 2012058692 | A | 3/2012 |
| JP | 2018128468 | A | 8/2018 |
| JP | 2019012258 | A | 1/2019 |

* cited by examiner

DISPLAY DEVICE AND ELECTRONIC DEVICE

TECHNICAL FIELD

The present disclosure relates to a display device and an electronic device.

BACKGROUND ART

In the human eye, there is a region of a macula in which, among the photoreceptor cells, cone cells are arranged at a high density on a retina, and the shape and color of an object being viewed can be determined by light incident on this region. A fovea is a portion corresponding to an area of a central portion of the macula, and contributes to vision in a human central field of view. The human visual field becomes the finest around the position of light incident on the fovea, and gradually becomes blurred from the center toward the periphery.

Foveated rendering is a technique for rendering an image, a shadow image, or the like particularly in an extended reality (XR) field such as virtual reality (VR) in consideration of such characteristics of a human visual field. The foveated rendering is a technique of outputting an image with a higher resolution toward the center of a field of view where a person can acquire a high definition image, and outputting an image with a reduced resolution in a peripheral field of view.

This method is often mainly implemented at the timing of generating an image by the processing circuit. The foveated rendering makes it possible to reduce the cost of image processing in a computer.

CITATION LIST

Patent Document

Patent Document 1: Japanese Patent Application Laid-Open No. 2018-128468

SUMMARY OF THE INVENTION

Problems to be Solved by the Invention

The present disclosure provides, by way of non-limiting example, at least some implementations for a display device that provides low power consumption foveated rendering.

Solutions to Problems

According to an embodiment, a display device includes a plurality of pixels, a first signal line, a first circuit, a second signal line, a second circuit, a third signal line, a third circuit, and a switch. The plurality of pixels is arranged in a two-dimensional array of lines and columns. The first signal line extends along a direction of the line and is connected to the plurality of pixels belonging to the line. The first circuit is connected to the first signal line. The second signal line extends along a direction of the column and is connected to the plurality of pixels belonging to the column. The second circuit is connected to the second signal line. The third signal line extends along a direction of the column and is connected to the plurality of pixels belonging to a column adjacent to the column to which the second signal line is connected. The third circuit is connected to the third signal line. The switch switches an electrical connection between the second signal line or the second circuit and the third signal line.

The first signal line may be arranged for each line, and the second signal line and the third signal line connected through the switch may be arranged for every two columns.

The pixel may include a light emitting element that emits light of a plurality of colors, the second signal line may extend along the column direction for each of a plurality of colors with respect to the same pixel, and the third signal line may extend along the column direction for each of a plurality of colors with respect to the same pixel, and may be connectable to the second signal line connected to the light emitting element of the same color through a switch.

The first circuit may output a signal for driving the pixel, may output a drive signal for each of the first signal lines to the first signal lines connected to the plurality of pixels belonging to a predetermined region, and may output a drive signal for each of a predetermined number of the first signal lines to the first signal lines not connected to the pixels belonging to the predetermined region.

The first circuit may output a drive signal for performing doubler driving in the first signal line not connected to the pixel belonging to the predetermined region.

The third signal line connected to the pixel belonging to the predetermined region may be electrically disconnected from the second signal line, and the third signal line not connected to the pixel belonging to the predetermined region may be electrically connected to the second signal line through the switch.

The third circuit may not output a signal for controlling the light emission intensity of the pixel to the third signal line not connected to the pixel belonging to the predetermined region.

The display device may further include a fourth circuit that switches the switch. The fourth circuit may switch the switch to electrically disconnect the third signal line connected to the pixel belonging to the predetermined region from the second signal line, and connect the third signal line not connected to the pixel belonging to the predetermined region to the second circuit directly or through the second signal line.

The display device may further include a fifth circuit that is connected to the third circuit and compares a voltage output from the third circuit with a predetermined voltage. The third circuit may output a signal for controlling light emission intensity of the pixel of the predetermined voltage or higher or a first offset voltage to the third signal line connected to the pixel belonging to the predetermined region, and May output a signal of less than the predetermined voltage or a second offset voltage to the third signal line not connected to the pixel belonging to the predetermined region. The fifth circuit may switch the switch on the basis of a result of the comparison to selectively connect the third signal line to the second circuit.

The fifth circuit may switch the switch to electrically disconnect the second signal line and the third signal line in a case where the voltage applied to the third signal line is equal to or higher than a predetermined voltage, and electrically connect the second circuit and the third signal line directly or through the second signal line in a case where the voltage applied to the third signal line is lower than the predetermined voltage.

The switch may switch connection between one of the second circuit and the third circuit, and the third signal line.

The second circuit may be connected to the second signal line and the corresponding third signal line through a same amplifier.

According to an embodiment, an electronic device includes: the display device described above; and a sensor that acquires a position of a line-of-sight of a person in the display device, in which the predetermined region is an area including the pixels corresponding to a direction in which the line-of-sight of the person is directed, and the fourth circuit acquires a position of the predetermined region from an output of the sensor, and selectively switches the switch based on the position of the predetermined region.

According to one embodiment, an electronic device includes: the display device described above; and a sensor that acquires a position of a line-of-sight of a person in the display device, in which the predetermined region is a region including the pixel corresponding to a direction in which the line-of-sight of the person is directed, and the third circuit acquires a position of the predetermined region from an output of the sensor, and outputs a signal for controlling light emission intensity of the pixel having a voltage equal to or higher than the predetermined voltage or a signal having a voltage lower than the predetermined voltage on the basis of the position of the predetermined region.

MODE FOR CARRYING OUT THE INVENTION

Figure 1:
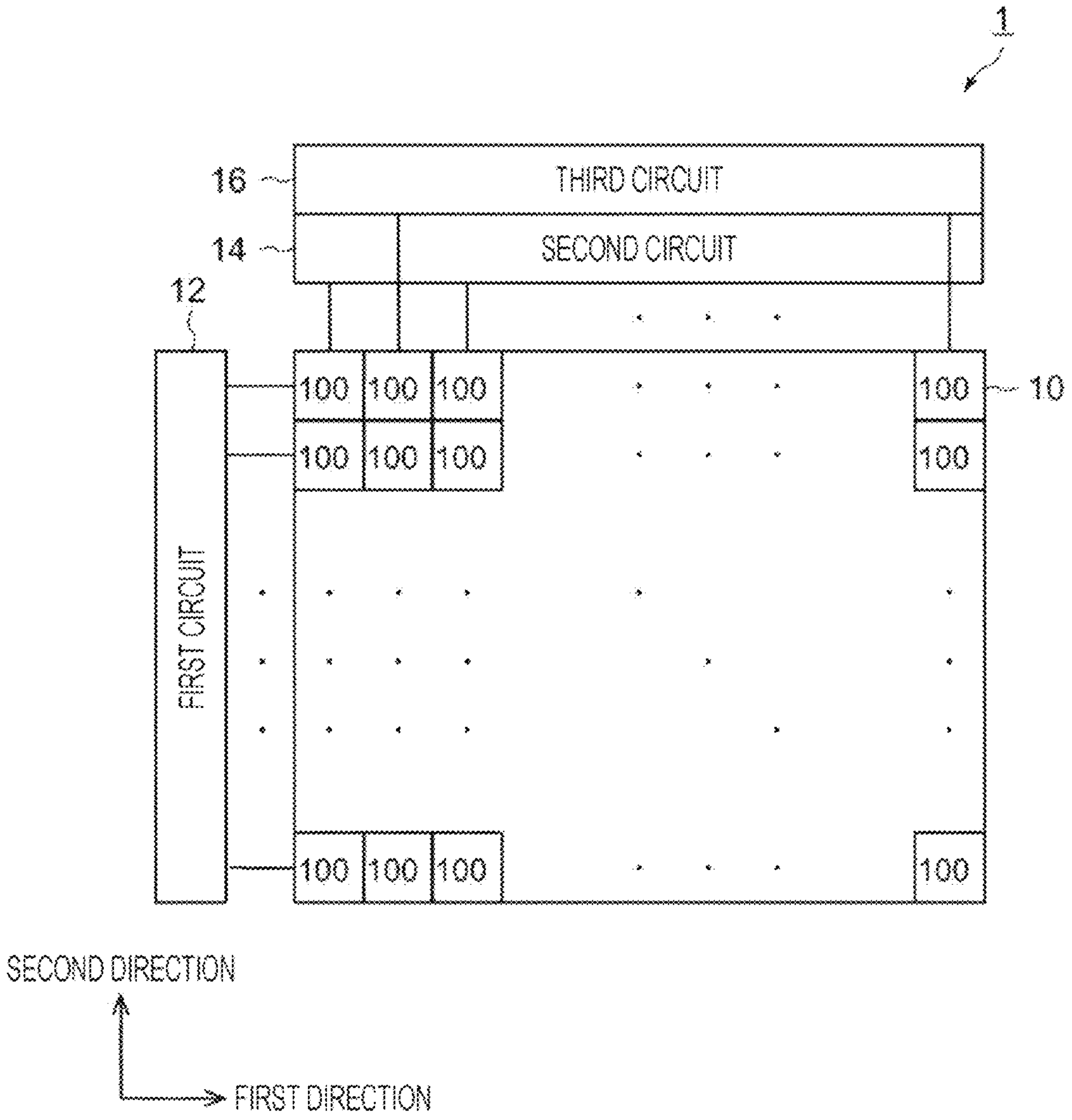
FIG. 1 is a diagram schematically illustrating an example of a display device according to an embodiment.

The following is a description of embodiments of the present disclosure, with reference to the drawings. The drawings are used for explanation, and the shape and size of each configuration in actual devices, the ratios of size to other configurations, and the like are not necessarily as illustrated in the drawings. Further, since the drawings are illustrated in a simplified manner, it should be understood that components necessary for implementation other than those illustrated in the drawings are provided as appropriate.

In addition, in the present disclosure, there are portions where "greater than or equal to" and "less than" are described, but these portions can be read as "greater than" and "less than or equal to", respectively.

In addition, in the present disclosure, "connect" means mainly to electrically connect, and in a case where it is simply described to connect, it means that an electrical connection state is maintained appropriately depending on the context even if it is not explicitly described as "electrically".

First Embodiment

FIG. 1 is a diagram schematically illustrating a display device according to an embodiment. A display device 1 includes a pixel array 10, a first circuit 12, a second circuit 14, and a third circuit 16. Also, although not illustrated, the display device 1 is appropriately provided with a control circuit that executes separate control, a power supply circuit that supplies a power supply voltage to each circuit, and the like.

The pixel array 10 includes a plurality of pixels 100. The pixels 100 are arranged in a two-dimensional array in a line direction (first direction) and a column direction (second direction). Each pixel 100 includes a pixel circuit including a light emitting element. The pixel 100 emits light on the basis of a drive signal input to the pixel circuit and a signal indicating light emission intensity. Each of the pixels 100 may include, for example, a light emitting element that emits light of RGB colors.

The first circuit 12 is a horizontal drive circuit connected to each of the pixels 100 arranged along the line direction through signal lines extending in the line direction. The first circuit 12 controls driving of the pixel 100 for each line through the signal line.

The second circuit 14 is a vertical drive circuit connected to each of the pixels 100 arranged along the column direction through a signal line extending in the column direction. The second circuit 14 controls the light emission intensity of the pixel 100 for each column through the signal line. The second circuit 14 and the pixel 100 are connected through a signal line for each light emitting element that emits light of each color included in each pixel 100.

The third circuit 16 is a vertical drive circuit of a system different from the second circuit 14, connected to each of the pixels 100 arranged along the column direction through a signal back extending in the column direction. The third circuit 16 controls the light emission intensity of the pixel 100 for each column through the signal line. The third circuit 16 and the pixel 100 are connected through a signal line for each light emitting element that emits light of each color included in each pixel 100.

The second circuit 14 and the third circuit 16 are connected to, for example, signal lines that transfer signals to the pixels alternately for each column.

The display device 1 causes the pixel 100 to emit light on the line selected by the first circuit 12 on the basis of the light emission intensity output from the second circuit 14 or the third circuit 16, thereby displaying an image, a shadow image, and the like.

Note that, although not illustrated, a driver that distributes and outputs a signal related to an image, for example, a signal indicating intensity for causing each pixel 100 to emit light to the second circuit 14 and the third circuit 16 may be separately provided.

Figure 2:
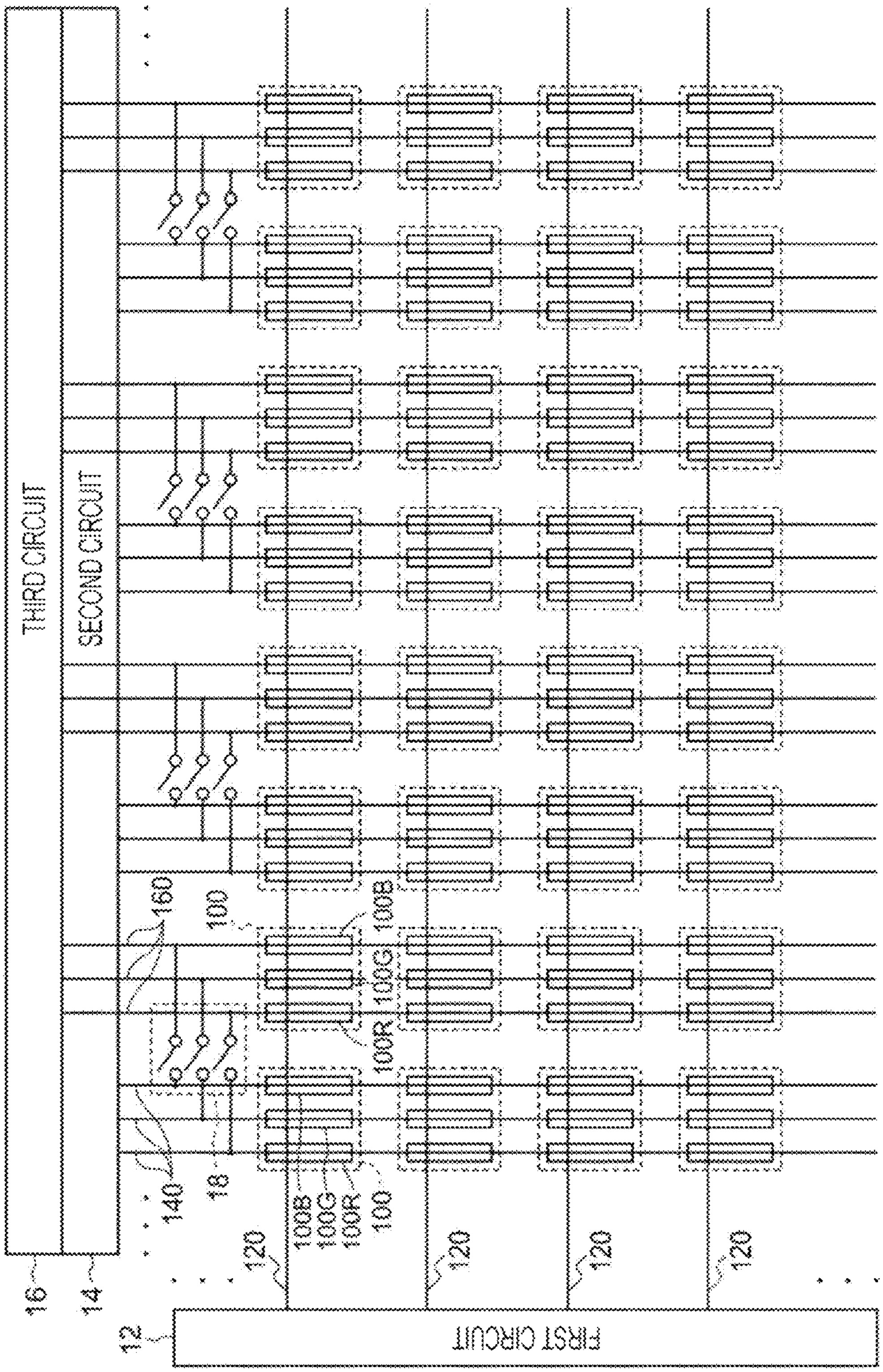
FIG. 2 is a diagram schematically illustrating an example of a connection relationship in the display device according to the embodiment.

FIG. 2 is a diagram illustrating an example of connection between a part of the pixel 100 and the first circuit 12 and the second circuit 14.

As an example, each pixel 100 includes a subpixel 100R that emits red (R) light, a subpixel 100G that emits green (G) light, and a subpixel 100B that emits blue (B) light.

Note that, as a non-limiting example, the arrangement of the sub-pixels that emit the respective colors may be a stripe arrangement, but may be another arrangement such as a pentile arrangement. Furthermore, the pixel 100 includes a subpixel having a light emitting element that emits light of three primary colors of RGB, but may further include a subpixel having a light emitting element that emits light of another color.

The first circuit 12 is connected to a sub-pixel that emits light of each color of each pixel 100 through a first signal line 120. The first signal line 120 extends in the line direction, and the pixels 100 belonging to the same line are connected to the same first signal line 120.

The second circuit 14 is connected to a sub-pixel that emits light of each color of each pixel 100 through a second signal line 140. The second signal line 140 extends in the column direction, and the pixels 100 belonging to the same column are connected to the same second signal line 140.

The third circuit 16 is connected to a sub-pixel that emits light of each color of each pixel 100 through a third signal line 160. The third signal line 160 extends in the column direction, and the pixels 100 belonging to the same column are connected to the same third signal line 160.

The second signal line 140 and the third signal line 160 are alternately arranged for each column, for example. The second signal line 140 and the third signal line 160 are arranged as a set of these two signal lines. For example, in the drawing, the second signal line 140 belonging to the leftmost column and the third signal line 160 belonging to the column adjacent to the leftmost column form one set of signal lines. In other words, the second signal line 140 and the third signal line 160 may be arranged every two columns.

The third signal line 160 can be connected to the third circuit 16 and can be connected to the corresponding second signal line 140 through a switch 18. More specifically, the second signal line 140 and the third signal line 160 for sub-pixels having light emitting elements of the same color can be connected through the switch 18.

As an example, in a case where numbers are assigned to the columns from the left end of the drawing, odd numbers are assigned to the second signal lines 140, and even numbers are assigned to the third signal lines 160. The third signal line 160 can be connected to the second signal line 160 having the number immediately before the number of the third signal line 140 through the switch 18.

Figure 3:
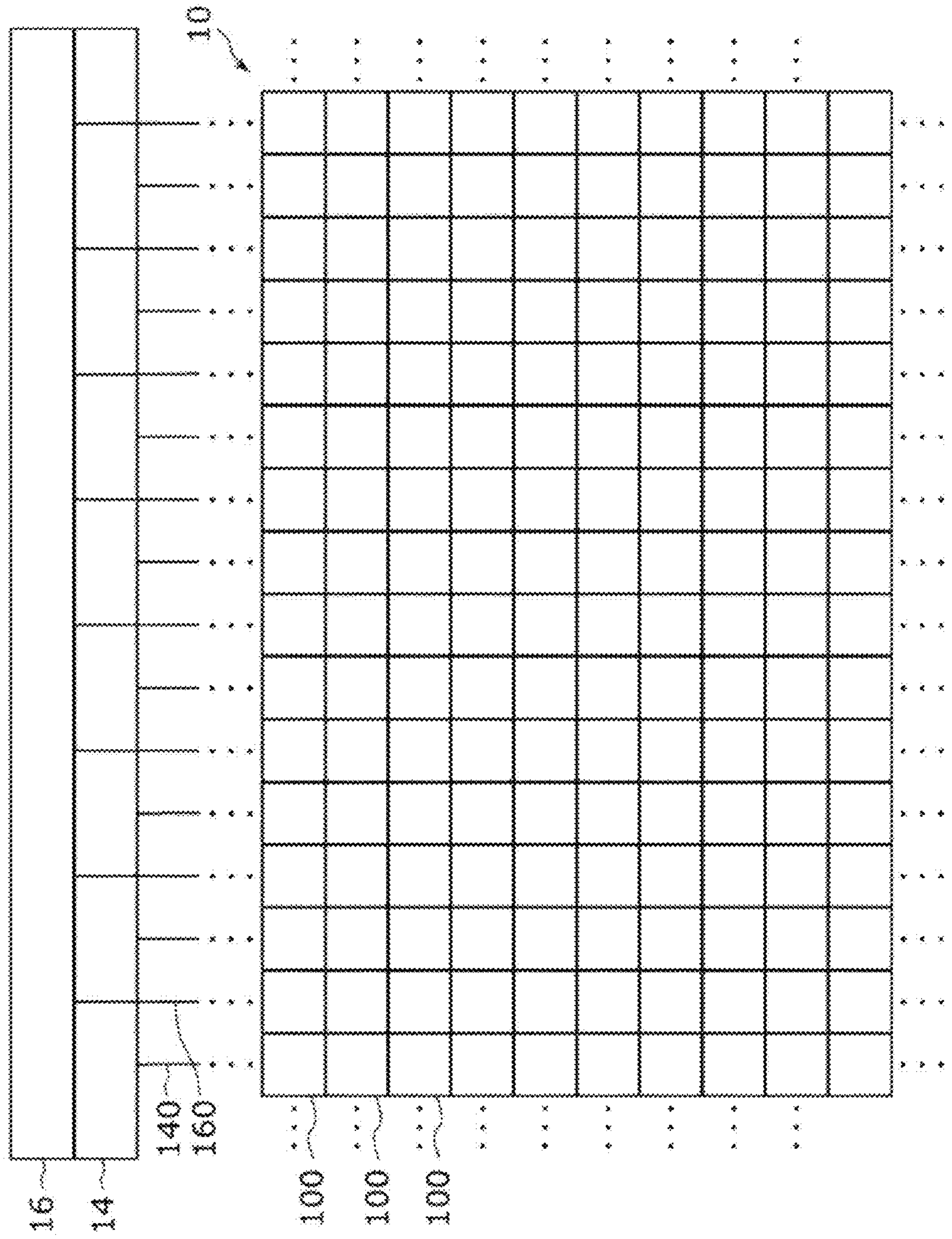
FIG. 3 is a diagram schematically illustrating an example of display of a pixel according to an embodiment.

FIG. 3 is a diagram schematically illustrating an example of a part of a display area of the display device according to the embodiment.

The pixels 100 belonging to the same column are connected to the same second signal line 140 as described above. Then, the pixels 100 belonging to the column adjacent to this column are connected to the same third signal line 160. In this drawing, the switch is controlled such that the third signal line 160 is electrically disconnected from the corresponding second signal line 140.

In a normal state, the pixel 100 belonging to the line driven by the first circuit 12 (not illustrated) acquires the signal indicating the light emission intensity in the pixel output from each of the second circuit 14 and the third circuit 16 from the second signal line 140 or the third signal line 160, and emits light with appropriate intensity. The first circuit 12 appropriately drives the pixel 100 for each line, and controls the pixel 100 to emit light based on a signal acquired from the second circuit 14 or the third circuit 16.

That is, in the pixel 100, the light emission intensity is input to each pixel through the signal line, and the light emitting element in the pixel 100 emits light according to the light emission intensity. Note that the above description does not exclude the control in which the first circuit 12 drives the two lines at the same timing and transmits a signal indicating the intensity of light emitted in each pixel 100 to the pixels 100 belonging to each line.

As described above, in the pixel 100, sub-pixels that emit light of different colors may be provided.

In the normal state, the display device 1 transmits the signal related to the intensity of light emission from the second circuit 14 and the third circuit 16 to the pixel 100 without thinning out the signal. The pixel 100 causes the light emitting element to emit light with an appropriate intensity on the basis of a signal received from the second circuit 14 or the third circuit 16.

Figure 4:
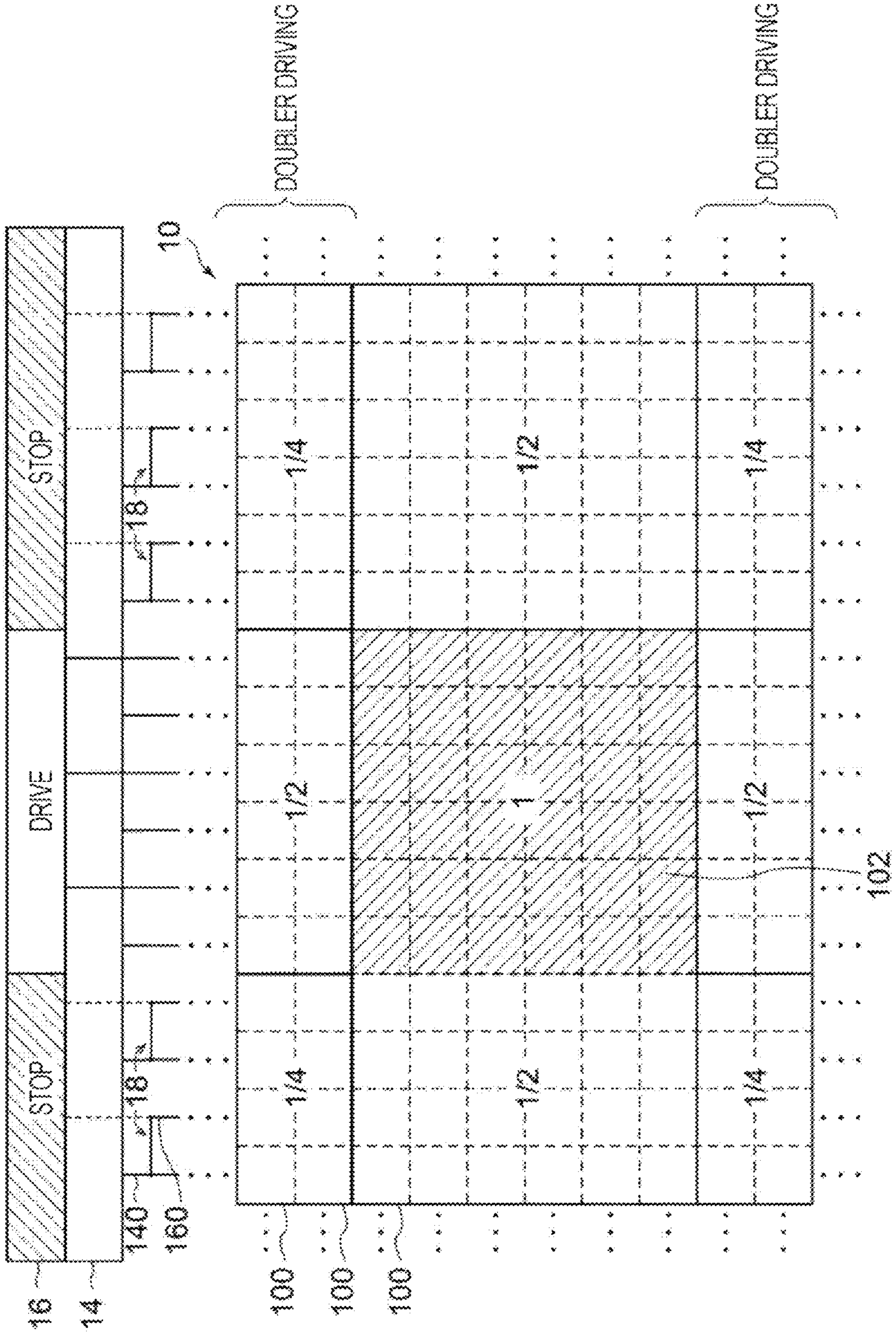
FIG. 4 is a diagram schematically illustrating an example of display of a pixel according to an embodiment.

FIG. 4 is a diagram schematically illustrating an example of a part of a display area of a display device according to an embodiment. In FIG. 4, connection between the pixel 100 and the circuit is illustrated for a predetermined region 102 to which the pixel 100 output with high resolution (resolution in the normal state) belongs and a peripheral region thereof. A solid line indicates a boundary between regions having different resolutions, and a broken line indicates a boundary between the pixels 100.

The predetermined region 102 is, for example, a region based on a visual field of a person viewing the display device 1. In order to realize foveated rendering, the resolution of the image and the shadow image in the predetermined region 102 may be set to be high, and the resolution of the image and the shadow image in the other region may be lower than the resolution in the predetermined region 102.

Note that, in the description, 6×6 pixels are set as the pixels 100 belonging to the predetermined region 102, but this is illustrated as a non-limiting example. For example, the predetermined region 102 may be a larger region such as 32×32 pixels or a horizontally long region such as 32×64 pixels. These numerical values are also given as non-limiting examples, and the number of pixels set as the predetermined region 102 can be arbitrarily changed within an appropriate range.

The pixels 100 belonging to the predetermined region 102 are controlled in the similar manner as in the case of FIG. 3 from the first circuit 12, the second circuit 14, and the third circuit 16 (not illustrated), and one color is reproduced per pixel. As a result, a high-resolution image and a shadow image similar to those in the normal state are displayed in the predetermined region 102.

For lines that do not include the pixels 100 belonging to the predetermined region 102, signals indicating the same light emission intensity are output from the first circuit 12 for every predetermined number of lines. The predetermined number of lines may be, for example, two lines. In this case, in a line not including the predetermined region 102, driving is performed by so-called doubler driving.

That is, the first circuit 12 outputs a signal for driving the pixel. The first circuit 12 outputs a drive signal for each of the first signal lines 120 to the first signal lines 120 connected to the pixels 100 belonging to the predetermined region 102. On the other hand, the first circuit 12 may output a drive signal for each predetermined number of first signal lines 120 to the first signal lines 120 that are not connected to the pixels 100 belonging to the predetermined region 102. The predetermined number may be two or more. Furthermore, as will be described later, the number may change in relation to the predetermined region 102.

Through this processing, for example, the doubler processing, an image and a shadow image having a resolution of at least ½ are output to the lines arranged above and below the predetermined region 102 as compared with the predetermined region 102. For this reason, for example, the outputs from the same amplifier can be used for the pixels 100 for two lines in the column direction, and the power consumption of the first circuit 12 in the region other than the predetermined region 102 can be reduced by the doubler processing.

The pixels 100 belonging to the column are also controlled similarly to the processing of this line. For example, for the pixel 100 belonging to the predetermined region 102, the second circuit 14 and the third circuit 16 output a signal indicating each light emission intensity to each column (pixel 100). On the other hand, in the other area, a signal obtained by thinning out the image and the video information is output.

The second circuit 14 also outputs a signal indicating the light emission intensity in the column connected to the pixel 100 belonging to the region other than the predetermined region 102, similarly to the normal state. Similarly to the normal state, the second circuit 14 outputs a signal indicating the light emission intensity of the pixel 100 in the line selected in the first circuit 12 to the pixel 100 through the second signal line 140.

On the other hand, the third circuit 16 switches the control method between the column connected to the pixel 100 belonging to the predetermined region 102 and the other columns. For example, the third circuit 16 may stop the operation of a circuit such as an amplifier connected to a column not connected to the pixel 100 belonging to the predetermined region 102.

With stopping, the light emission of the pixel 100 is stopped, but in order to interpolate this, the third signal line 160 whose output from the third circuit 16 is stopped is connected to the second signal line 140 corresponding to the third signal line 160 through the switch 18.

That is, in a state where the predetermined region 102 is set, the third signal line 160 connected to the pixel 100 belonging to the predetermined region 102 is electrically disconnected from the second signal line 140, and the output from the third circuit 16 is propagated to the pixel 100. On the other hand, the third signal line 160 not connected to the pixel 100 belonging to the predetermined region 102 is electrically connected to the second signal line 140 through the switch 18, and the output from the second circuit 14 is propagated to the pixel 100.

As illustrated in FIG. 4, the third circuit 16 may not output the signal for controlling the light emission intensity to the third signal line 160 connected to second signal line 140. Furthermore, the operation of an amplifier or the like connected to these third signal lines 160 may be stopped.

As described above, the second circuit 14 and third circuit 16 are controlled so that signals to be output can be thinned out in a region other than predetermined region 102. For example, in a case where the second signal line 140 and the third signal line 160 are connected on a one-to-one basis through the switch 18, in a column not including the predetermined region 102, the output signal can be thinned out to ½, and the power consumption can be reduced to about ½.

The resolution is ½ except for the columns belonging to the predetermined region 102.

Considering the operation of the first circuit 12, the region belonging to the column belonging to the predetermined region 102 and belonging to the line not belonging to the predetermined region 102 and the region belonging to the line belonging to the predetermined region 102 and belonging to the column not belonging to the predetermined region 102 have the resolution of ½. In addition, in the regions of the line and the column that do not belong to the predetermined region 102, the control signal propagating in the line direction and the column direction is ½, so that the resolution is ¼.

The switch 18 switches the connection between either the second circuit 14 or the third circuit 16 and the third signal line 160, so that the high-resolution region and the low-resolution region can be set for each region as described above.

The predetermined region 102 is set so that the switch is switched as described above. The switching of the switch may be performed in units of frames or may be performed in units of signal output to the line.

Figure 5:
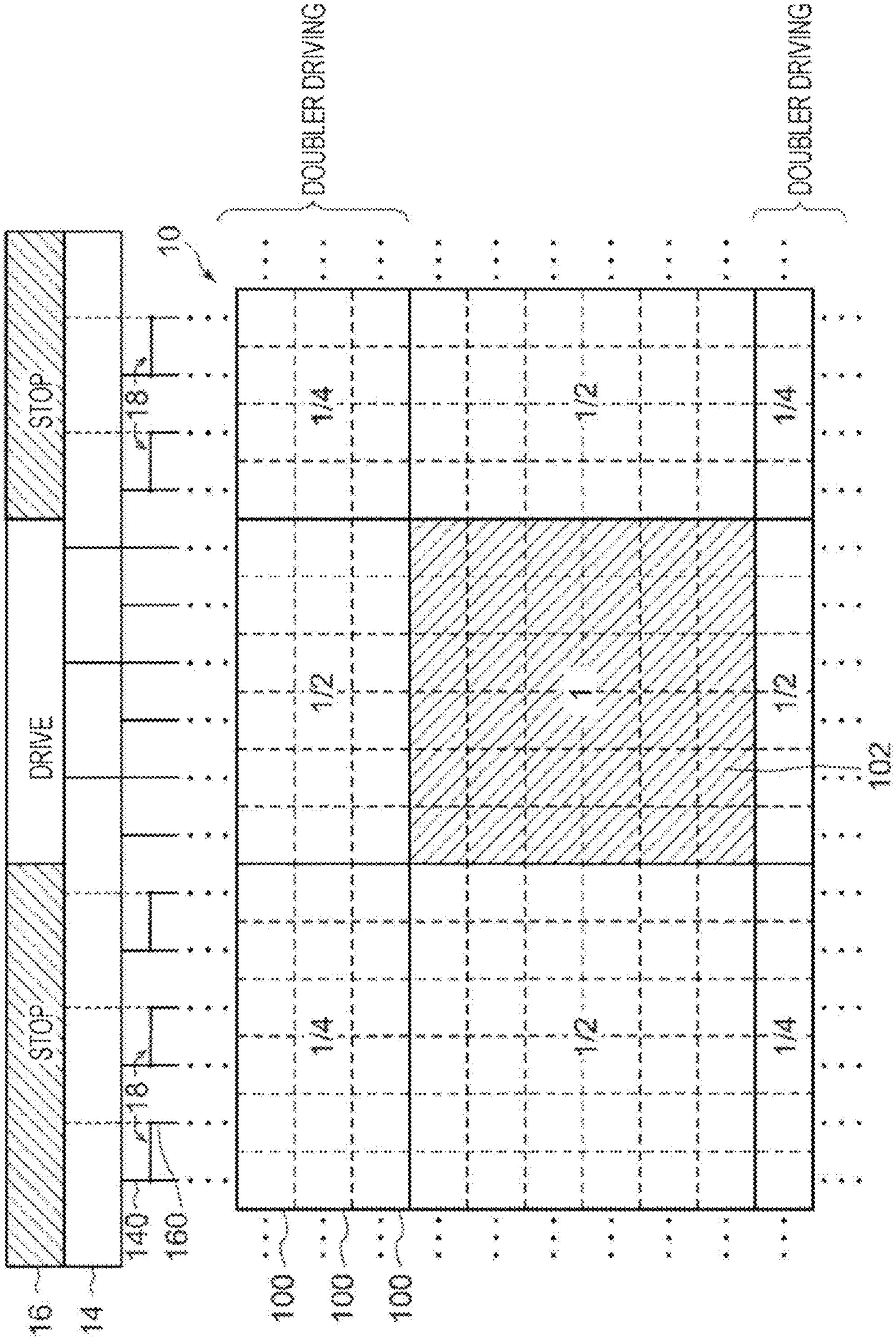
FIG. 5 is a diagram schematically illustrating an example of display of a pixel according to an embodiment.

FIG. 5 is a diagram illustrating a state in which the predetermined region 102 moves to a position different from that in FIG. 4. For example, it is assumed that the predetermined region 102 moves to the state of FIG. 5 while drawing is performed in the state of FIG. 4. In this case, the display device 1 may switch the switch 18 at a timing of detecting the movement of predetermined region 102. As described above, the display device 1 can switch the display from a line next to the currently controlled line with the resolution appropriately reflecting the movement of the predetermined region 102 by switching the switch 18 at the timing of detecting the movement of the predetermined region 102.

In addition, the switch 18 may be switched at the timing when the movement of the predetermined region 102 is detected and the processing of the frame is completed. In this way, the display can be switched for each frame processing.

In any case, the switching of the doubler processing from the first circuit 12 may be executed at the same timing as the switching of the switch 18. The switch 18 is controlled in units of frames so that the cost of controlling the switch 18 can be suppressed, and the switch 18 is controlled in units of lines so that it is possible to set a high-resolution region that follows quickly by changing the field of view.

Note that, in the above description, the resolution is controlled to be 1, ½, and ¼ in the predetermined region 102, the region where the column or line overlaps with the predetermined region 102, and the other regions, respectively, but the present invention is not limited thereto. For example, the number of drivers may be further increased to set the region of ⅓. Instead of the number of drivers, the ratio of the third signal line 160 to the second signal line 140 can be increased.

Furthermore, instead of these three regions, the regions may be further subdivided. For example, a region in which the resolution in the column direction and/or the line direction is ¼ may be set according to a distance from the predetermined region 102. This ratio of ¼ is also m shown as an example without limitation, and it does not exclude thinning of the application of the voltage to the signal line at a ratio other than ¼.

The plurality of display devices 1 may operate in synchronization. In this case, similar processing can be executed for the predetermined region 102 set in both the display devices 1.

Also, as another example, one display device 1 may be divided into two display areas. In this case, the predetermined region 102 may be set in each display region, and the first circuit 12, the second circuit 14, the third circuit 16, and the switch 18 may operate so as to control the pixels 100 in each display region by the predetermined region 102 in each display region. As a non-limiting example, one first circuit 12 may be provided to control the same line in two display regions. As another non-limiting example, one first circuit 12 may be provided for each of the two display areas.

As described above, the first circuit 12, the second circuit 14, the third circuit 16, and the switch 18 are appropriately operated, so that it is possible to suppress the power consumption of the display device 1 in the foveated rendering method of outputting a high-resolution image and a shadow image at the center of the visual field and outputting a lower-resolution image and a shadow image than the center of the visual field in the region around the visual field.

Second Embodiment

In the following embodiment, various control methods of the display device 1 described in the first embodiment will be described. First, in the present embodiment, another example of the operation of the switch 18 will be described. As described above, as an example, a case where one pixel 100 includes a light emitting element that emits light of three colors will be described, but the embodiment is not limited thereto.

Figure 6:
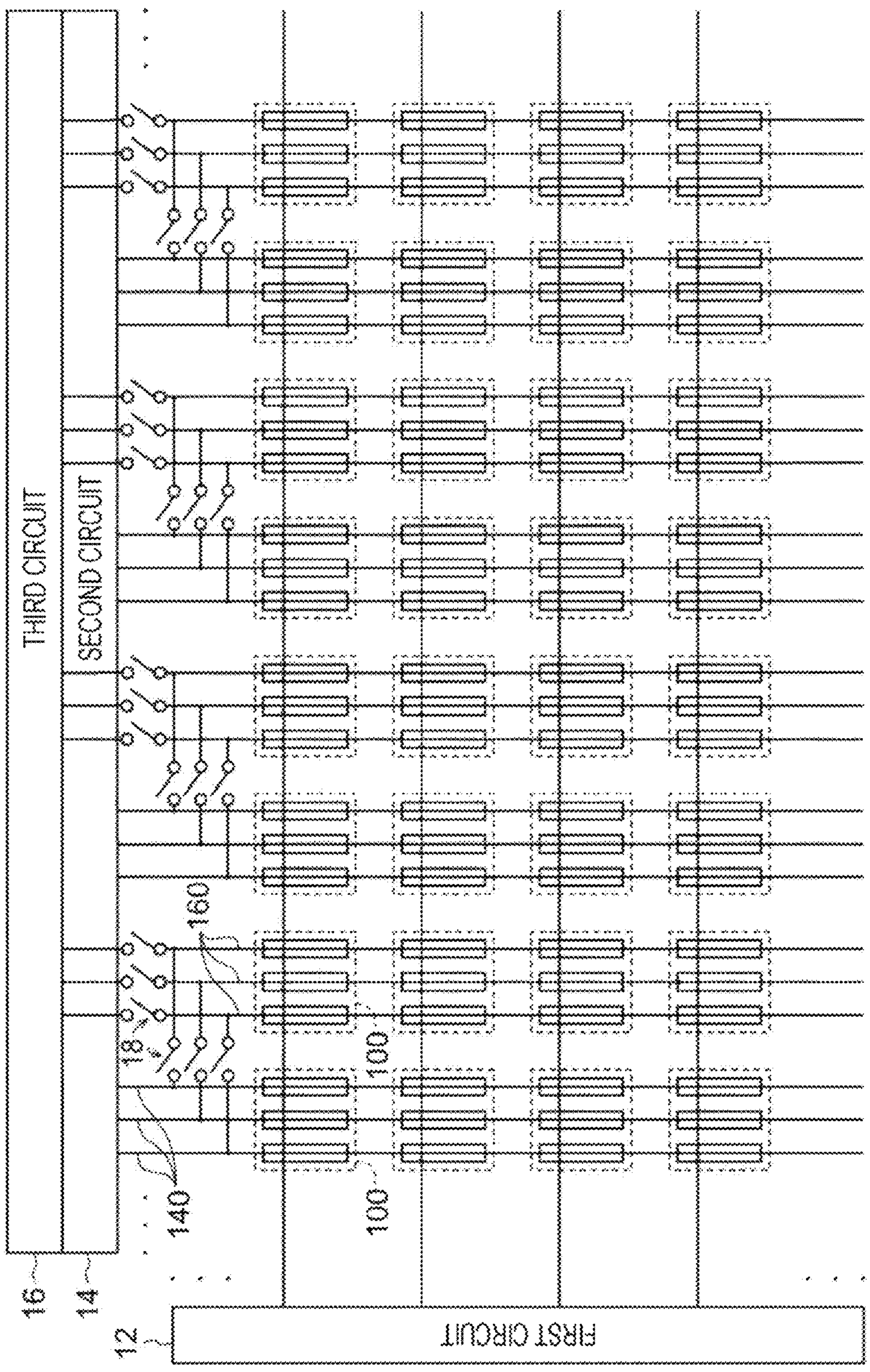
FIG. 6 is a diagram schematically illustrating an example of a connection relationship in the display device according to an embodiment.

FIG. 6 is a diagram illustrating a non-limiting example of connection between a pixel 100 and each circuit according to the embodiment.

A first circuit 12 includes a first signal line 120 for each line. The first signal line 120 is connected to each of the pixels 100 belonging to the same line. Each pixel 100 acquires a drive signal from the first circuit 12 through the first signal line 120, and drives the light emitting element on the basis of a drive signal.

In a case where a predetermined region is set, the first circuit 12 executes control to appropriately output the same drive signal to a predetermined number of lines, for example, doubler control, as in the above-described embodiment.

A second circuit 14 includes second signal lines 140 for every two columns. The second signal line 140 is connected to each of the pixels 100 belonging to the same column. Each pixel 100 acquires a signal indicating the light emission intensity from the second circuit 14 through the second signal line 140, and emits light from the light emitting element on the basis of the signal.

A third circuit 16 includes a third signal line 160 for every two columns. In the third signal line 160, the second signal line 140 is arranged in the inner column. The third signal line 160 is connected to each of the pixels 100 belonging to the same column. Each pixel 100 acquires a signal indicating the light emission intensity from the third circuit 16 through the third signal line 160 or from the second circuit 14 through the switch 18 and the second signal line 140, and emits light from the light emitting element on the basis of the signal.

In the first embodiment described above, the switch 18 is a switch that switches the connection relationship between the third signal line 160 and the second signal line 140, but in the present embodiment, furthermore, the connection relationship with the third circuit 16 is switched. The switch 18 switches whether the third signal line 160 is connected to the third circuit 16 or the second signal line 140.

For example, the switch 18 exclusively switches whether the third signal line 160 is connected to the second signal line 140 or the third circuit 16 in a period in which the pixel signal is transferred.

As described above, the third signal line 160 may switch the connection relationship with the second signal line 140 and the connection relationship with the third circuit 16 by the switch 18. With such control, the third signal line 160 can be disconnected from a circuit such as an amplifier that is stopped in the third circuit 16 at an appropriate timing, and an increase in power consumption due to a leakage current or the like can be suppressed.

Third Embodiment

Figure 7:
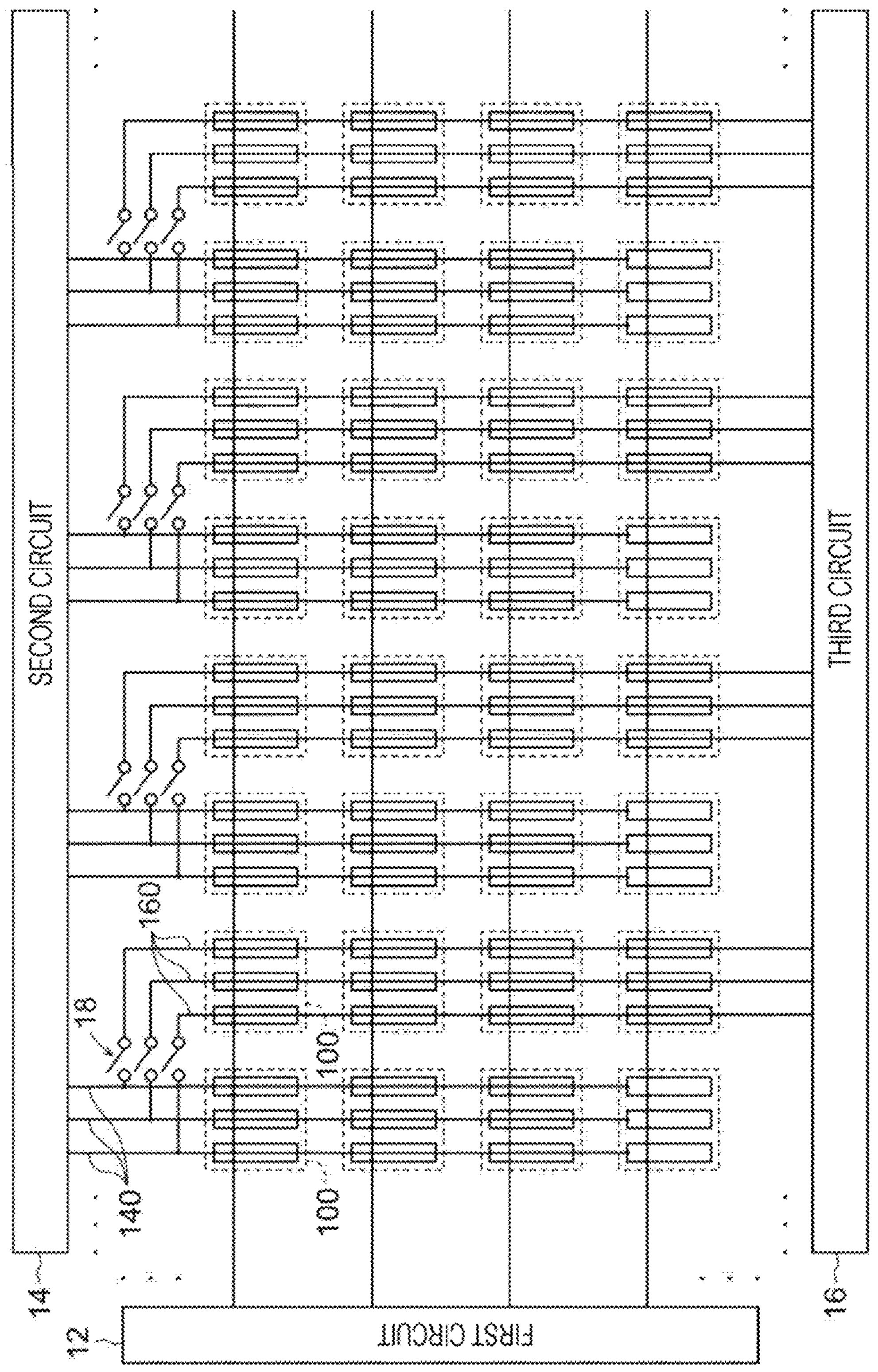
FIG. 7 is a diagram schematically illustrating an example of a connection relationship in the display device according to an embodiment.

FIG. 7 is a diagram illustrating a non-limiting example of connection between the pixel 100 and each circuit according to the embodiment. Hereinafter, the description of the connection in the above-described embodiment and portions without any particular change may be omitted.

In FIG. 7, a second circuit 14 and a third circuit 16 are disposed at different positions. For example, as illustrated in FIG. 7, the second circuit 14 and the third circuit 16 may be arranged so as to sandwich a pixel array 10 in which the pixels 100 are arranged in the column direction. However, this is illustrated as an example, and the arrangement is not limited to this arrangement. Thus, unlike FIG. 6, the second circuit 14 and the third circuit 16 may be disposed at different positions.

For example, a switch 18 switches connection between a third signal line 160 and a second signal line 140 on the second circuit 14 side.

As described above, the second circuit 14 and the third circuit 16 may not be arranged at the same position with respect to the pixel 100, but may be arranged at different positions. The arrangement is changed in this manner, so that it is also possible to widen the range of layout selection in circuit design.

Note that, similarly to FIG. 6, the third signal line 160 may also be provided with a switch on the third circuit 16 side. In this case, the switch 18 on the second signal line 140 side and the switch on the third circuit 16 side may be controlled to operate in synchronization with each other.

Fourth Embodiment

In each of the above-described embodiments, the circuits inside the second circuit 14 and the third circuit 16 are not particularly limited. For example, each of the second circuit 14 and the third circuit 16 may include one amplifier for the second signal line 140 and the third signal line 160 to be connected. As another example, an amplifier corresponding to a plurality of signal lines may be provided, and a signal line to be output by a selector may be selected.

Figure 8:
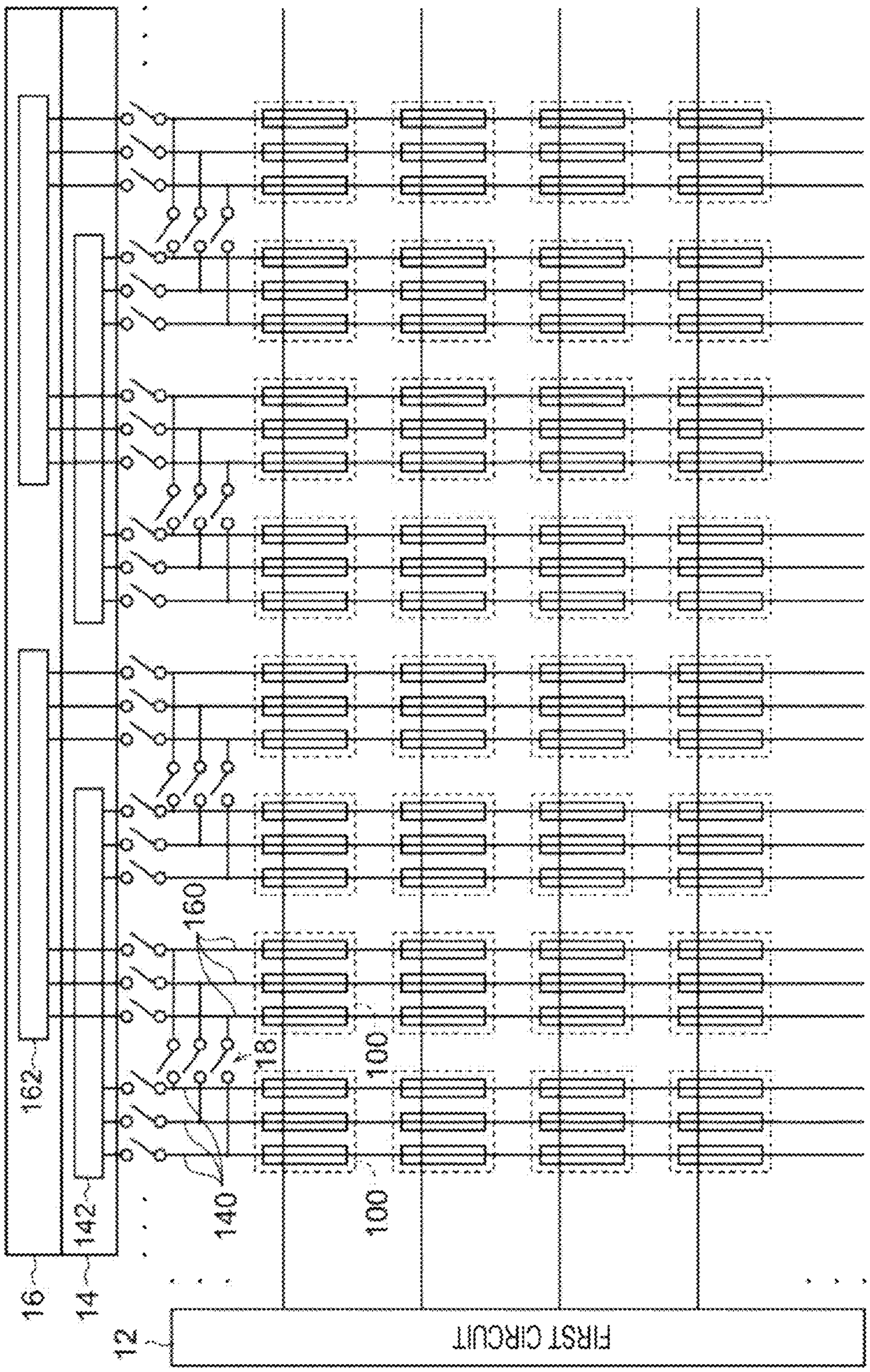
FIG. 8 is a diagram schematically illustrating an example of a connection relationship in the display device according to an embodiment.

FIG. 8 is a diagram illustrating a non-limiting example of connection between the pixel 100 and each circuit according to an embodiment.

The second circuit 14 includes an amplifier 142. The amplifier 142 amplifies and outputs a signal indicating the light emission intensity for the pixels 100 belonging to the plurality of columns.

The third circuit 16 includes an amplifier 162. The amplifier 162 amplifies and outputs a signal indicating the light emission intensity for the pixels 100 belonging to the plurality of columns.

These amplifiers may be provided with switches for outputting to the respective signal lines and may be driven as a selector.

The switch 18 switches whether the third signal line 160 is connected to the third circuit 16 or the second signal line 140 at an appropriate timing.

As described above, in the second circuit 14 and the third circuit 16, an output destination of the amplifier may be the pixel 100 over a plurality of columns. With reduction in the number of amplifiers, the degree of freedom of the circuit layout can be increased, and furthermore, power consumption can be reduced.

Note that, in FIG. 8, the amplifier is connected to the signal lines of the two columns, but the present invention is not limited thereto, and the amplifier may be connected to the signal lines of three or more columns. The same applies to the embodiments described below.

In addition, the switch that operates as the selector connected to the amplifier 162 of the third circuit 16 may operate in synchronization with the switch 18 as in the form of FIG. 6. In this case, the amplifier 162 can stop the operation at the timing of being disconnected from the third signal line 160.

Fourth Embodiment

Figure 9:
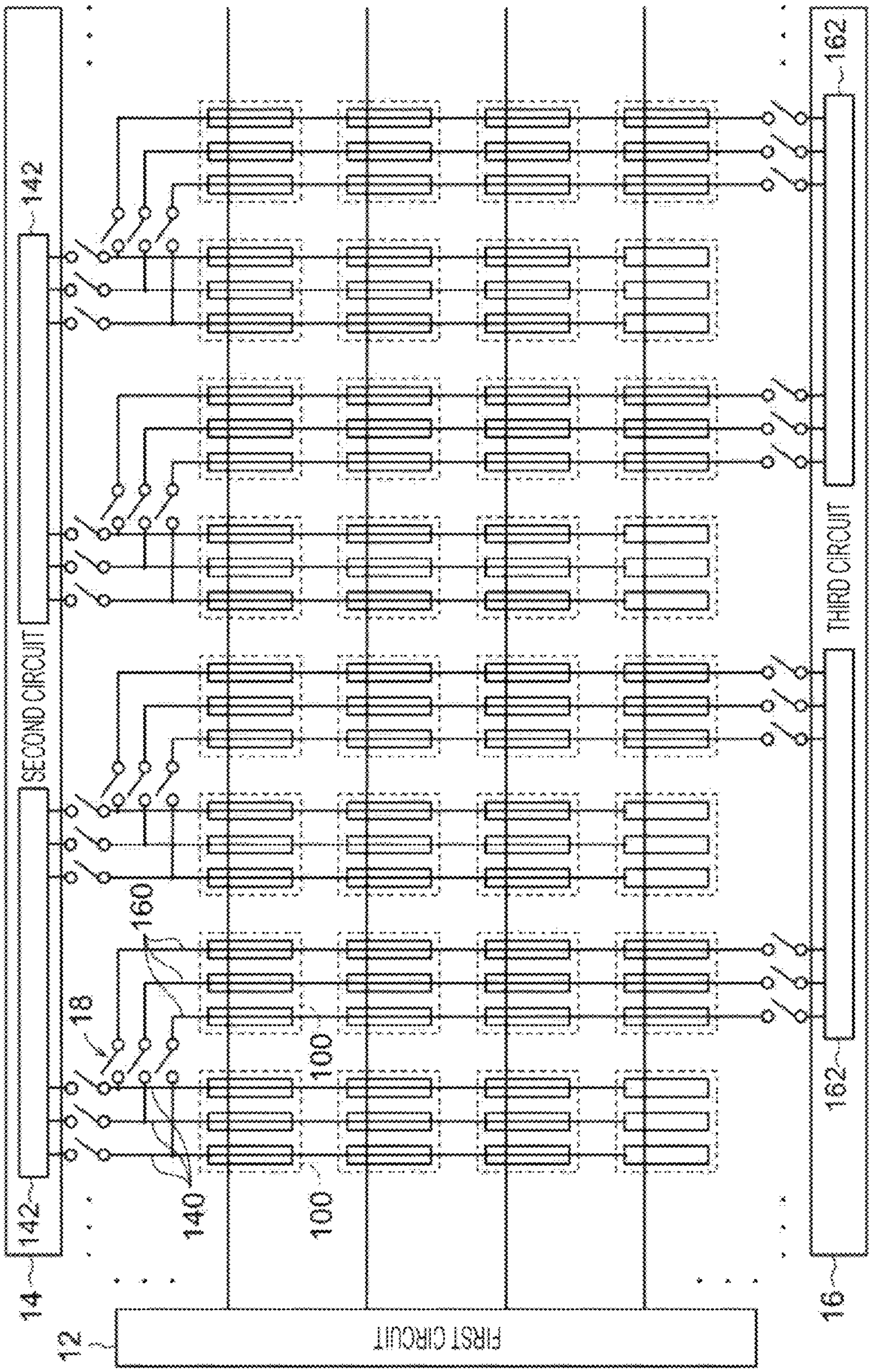
FIG. 9 is a diagram schematically illustrating an example of a connection relationship in the display device according to the embodiment.

FIG. 9 is a diagram illustrating a non-limiting example of connection between the pixel 100 and each circuit according to the embodiment. Similarly to the third embodiment described above, a second circuit 14 and a third circuit 16 include amplifiers 142 and 162, respectively. On the other hand, similarly to FIG. 7, the third circuit 16 is not disposed in the same region as second circuit 14, but is disposed at a different position.

The switch 18 switches connection and disconnection between the third signal line 160 and the second signal line 140 at an appropriate timing. Similarly to the above further note of the third embodiment, the switch that operates as the selector connected to the amplifier 162 may operate in synchronization with the switch 18 connected to the same third signal line 160. Further, the amplifier 162 can stop its operation in a case of being disconnected from the third signal line 160.

Fifth Embodiment

Figure 10:
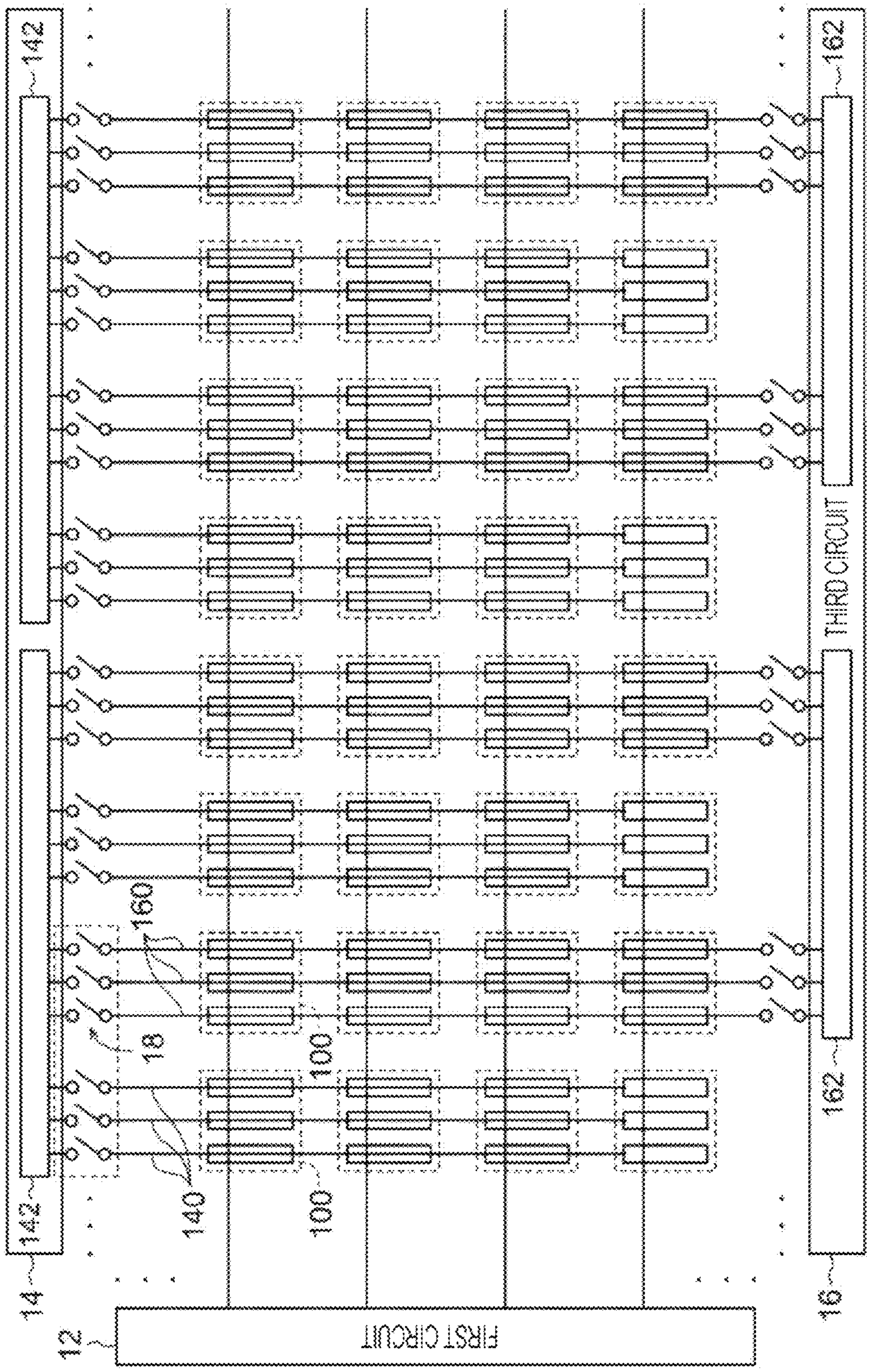
FIG. 10 is a diagram schematically illustrating an example of a connection relationship in a display device according to an embodiment.

FIG. 10 is a diagram illustrating a non-limiting example of connection between the pixel 100 and each circuit according to an embodiment. Similarly to the fourth embodiment described above, the second circuit 14 and the third circuit 16 include amplifiers 142 and 162, respectively.

A switch operating as a selector of the amplifier 142 of the second circuit 14 is arranged by switches surrounded by a broken line. The third signal line 160 may be directly connected to the amplifier 142 of the second circuit 14 through the switch 18 at an appropriate timing. That is, a part of the switch that operates as the selector of the output of the second circuit 14 may operate as the switch 18.

As described above, the second circuit 14 may be connected to the second signal line 140 and the third signal line 160 in the same amplifier 142. That is, the second circuit 14 may be connected to the second signal line 140 and the third signal line 160 corresponding to the second signal line 140 through the same amplifier 142.

In such a form, a switch for switching the connection state between the third signal line 160 and the second circuit 14 can be disposed as a part of the switch for selecting the output from the amplifier 142.

Sixth Embodiment

In each of the above-described embodiments, the connection example of the third signal line 160 by switching the switch 18 has been described. In the present embodiment, a non-limiting example of the switching control of a switch 18 will be described.

Figure 11:
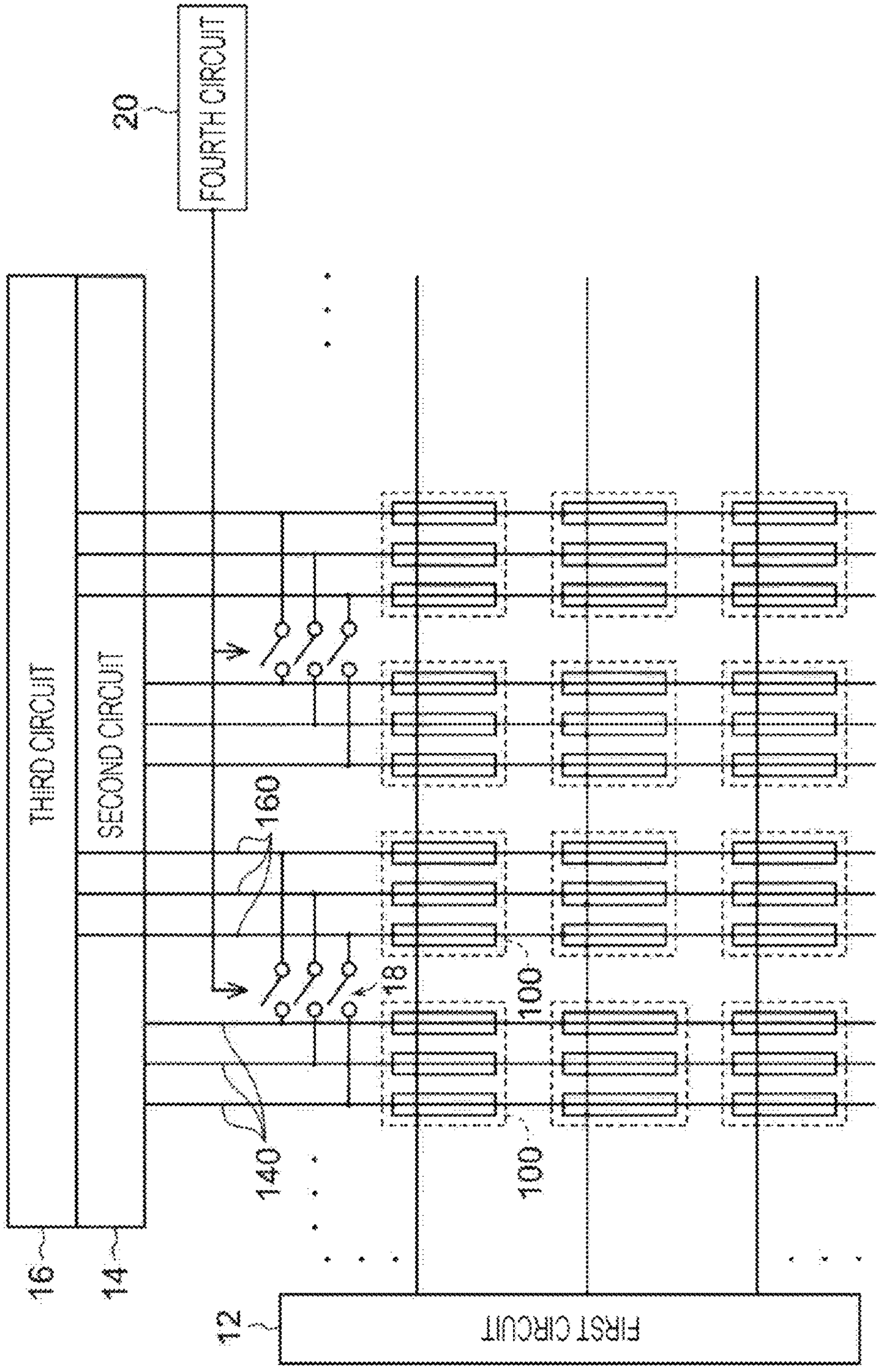
FIG. 11 is a diagram schematically illustrating an example of a connection relationship in a display device according to an embodiment.

FIG. 11 is a diagram illustrating a non-limiting example of connection between a pixel 100 and each circuit according to an embodiment. A display device 1 includes a fourth circuit 20. The fourth circuit 20 is a circuit that operates as a timing controller that controls the switch 18.

The fourth circuit 20 sets a predetermined region 102 on the basis of, for example, position information received from an external sensor, and acquires information on a column belonging to the predetermined region 102. Furthermore, as another example, the information on the set predetermined region 102 or the information regarding the column belonging to the predetermined region 102 may be acquired from the outside.

The fourth circuit 20 outputs a signal for switching the switch 18 to the switch 18 on the basis of the acquired information on the column belonging to the predetermined region 102. The switch 18 switches the connection between the third signal line 160 and the second signal line 140 or the second circuit 14 on the basis of the information acquired from the fourth circuit 20.

Even in a case where the connection state with a third circuit 16 is changed as illustrated in FIG. 6, the switch 18 appropriately switches connection and disconnection between third signal line 160 and a third circuit 16 on the basis of the control from fourth circuit 20.

That is, in a case where the predetermined region 102 is set, the fourth circuit 20 switches the switch 18, disconnects the third signal line 160 connected to the pixel 100 belonging to the predetermined region 102 from the second signal line 140 or the second circuit 14, and connects the third signal line 160 not connected to the pixel 100 belonging to the predetermined region 102 to the second circuit 14 through the second signal line 140 or directly.

In this manner, the information regarding the predetermined region 102 is acquired from the outside to switch the switch 18, so that an output suitable for foveated rendering can be realized.

Note that, although the arrangement in which the pixel 100, the second circuit 14, and the third circuit 16 are on the same side has been described, the arrangement is not limited thereto, and the second circuit 14 and the third circuit 16 may be provided so as to sandwich the pixel array 10. That is, the connection relationship among the pixel 100, the second circuit 14, the second signal line 140, the third circuit 16, the third signal line 160, and the switch 18 may be the connection according to any one of the above-described embodiments. The similarity applies to the following embodiments.

Seventh Embodiment

In the above-described sixth embodiment, the switch 18 is switched by provision of the fourth circuit 20, but in the present embodiment, another example of a circuit that executes switching control of the switch 18 will be described.

Figure 12:
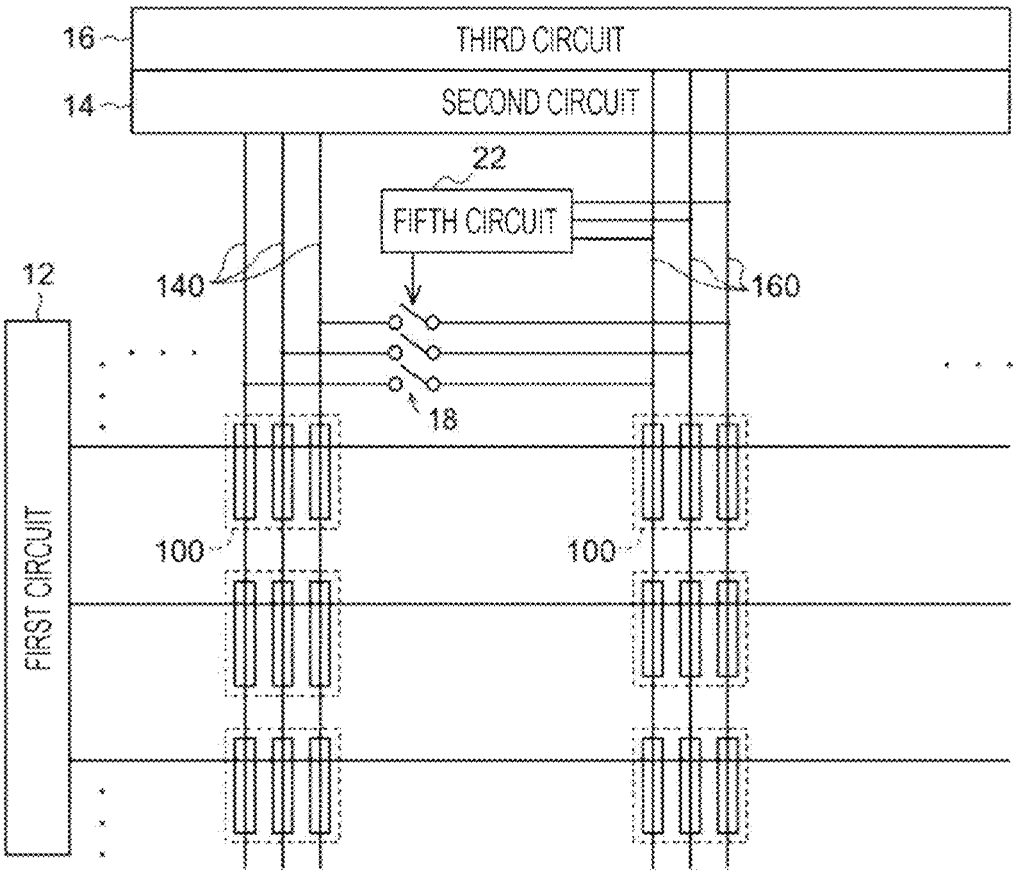
FIG. 12 is a diagram schematically illustrating an example of a connection relationship in a display device according to an embodiment.

FIG. 12 is a diagram illustrating a non-limiting example of connection between the pixel 100 and each circuit according to an embodiment. A display device 1 includes a fifth circuit 22. The fifth circuit 22 is a circuit that operates as a comparator that outputs a signal for controlling a switch 18.

For example, the fifth circuit 22 is connected to a third circuit 16 through third signal lines 160, and compares a voltage output from the third circuit 16 with a predetermined voltage. A signal for switching the switch 18 is output on the basis of the comparison result. The fifth circuit 22 may be, for example, a differential amplifier that compares a voltage applied to the third signal line 160 with a predetermined voltage, amplifies the comparison result to a voltage sufficient for switching the switch 18, and outputs the amplified voltage.

The third circuit 16 applies a voltage equal to or higher than the predetermined voltage to the third signal line 160 belonging to a predetermined region 102. This voltage may be a signal for controlling the light emission intensity of a pixel, or may be a first offset voltage equal to or higher than a predetermined voltage at a timing before the signal for controlling the light emission intensity is transferred.

On the other hand, the third circuit 16 applies a voltage less than the predetermined voltage to the third signal line 160 that does not belong to the predetermined region 102. Similarly to the above, this voltage may be a voltage lower than a signal value indicating that the light emission intensity is a minimum value, or may be a second offset voltage less than the predetermined voltage at the timing before the signal for controlling the light emission intensity is transferred. The voltage may be a voltage lower than the signal value indicating that the light emission intensity is the lowest value, or the second offset voltage may be the ground voltage.

The fifth circuit 22 switches the switch 18 on the basis of a voltage applied through the third signal line 160 and output from the third circuit 16 to appropriately selectively connect and disconnect (selectively connect) the third signal line 160 and the second signal line 140.

In a case where the offset voltage is applied before the signal for controlling the light emission intensity is transferred, the predetermined voltage and the offset voltage are set such that (second offset voltage)< (predetermined voltage)< (first offset voltage) is satisfied. With this setting, the fifth circuit 22 compares the predetermined voltage with the offset voltage at the timing when the offset voltage is applied, and can output the switching signal of the switch 18 based on the comparison result.

Furthermore, in the case that the comparison is performed using the signal indicating the light emission intensity of the pixel 100, (the voltage lower than the voltage indicating the minimum value of the light emission intensity)< (the predetermined voltage)< (the voltage indicating the minimum value of the light emission intensity) is met, so that the fifth circuit 22 can output the signal for switching the switch 18 using the signal indicating the light emission intensity appropriately. In a case where the comparison is performed using the voltage for controlling the light emission intensity, the third circuit 16 may stop the operation of the circuit for outputting the signal to the column for the column from which the signal is thinned out, and connect the third signal line 160 corresponding to the column to the ground voltage.

Eighth Embodiment

Figure 13:
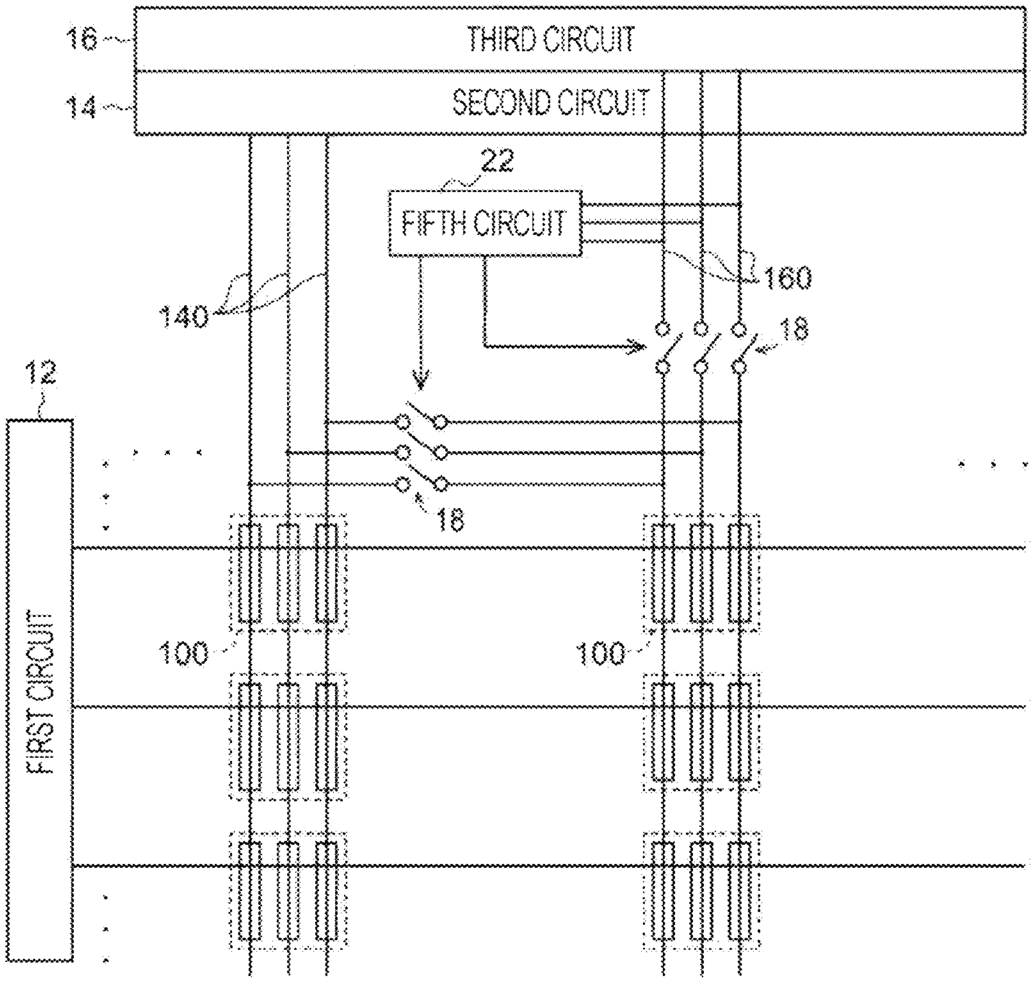
FIG. 13 is a diagram schematically illustrating an example of a connection relationship in a display device according to an embodiment.

FIG. 13 is a diagram illustrating another aspect of the fifth circuit 22. A display device 1 can also have a configuration of a switch 18 similar to the switch 18 illustrated in FIG. 6. In this case, the fifth circuit 22 is connected to third signal lines 160 upstream of a pixel 100 and the switch 18.

Then, the comparison result is appropriately amplified and output, so that the fifth circuit 22 may exclusively switch whether the third signal lines 160 are connected to a third circuit 16 or a second signal line 140 (or directly connected to the second circuit 14) by the switching switch 18.

According to the fifth circuit 22, it is possible to appropriately switch the switch 18 on the basis of the pixel value without separately providing a circuit and wiring that output an enable signal as in the circuit described in the sixth embodiment. In this case, the predetermined region 102 is set by the third circuit 16 or a driver provided at a preceding stage of the third circuit 16, and appropriate intensity information or an appropriate offset voltage is output from the third circuit 16.

As in the seventh and eighth embodiments, the fifth circuit 22 electrically disconnects the second signal lines 140 and the third signal lines 160 by switching the switch 18 in a case where a voltage applied to the third signal lines 160 at a predetermined timing is equal to or higher than a predetermined voltage, and electrically connects the second circuit 14 and the third signal line 160 through the second signal lines 140 or directly in a case where the voltage is lower than the predetermined voltage.

Figure 14:
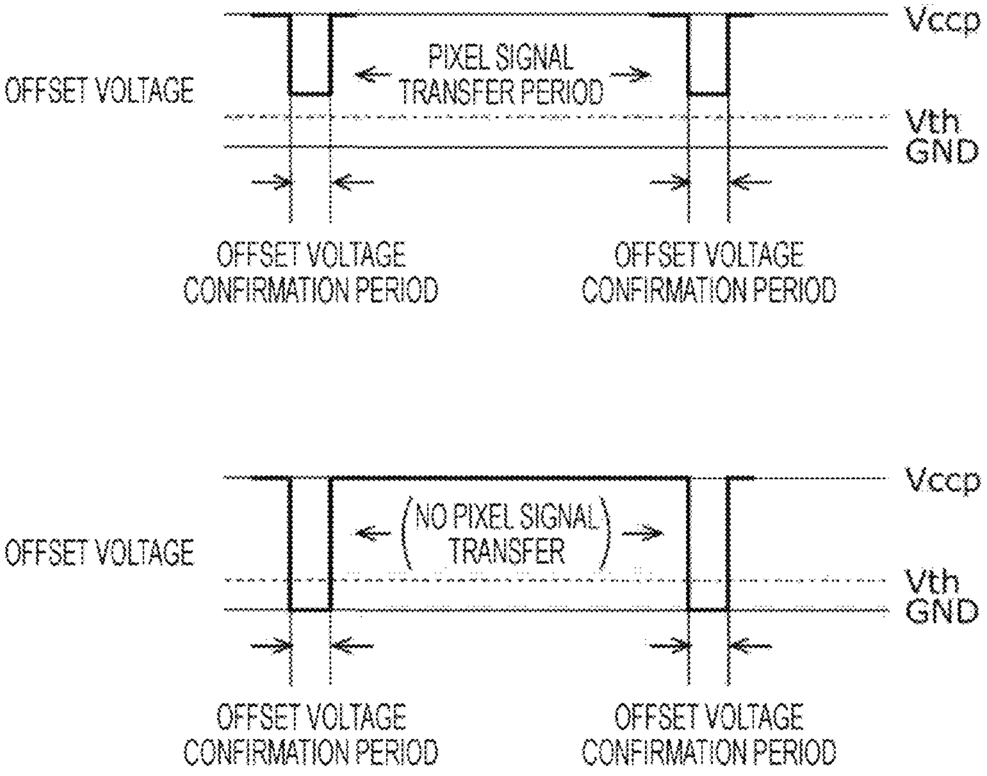
FIG. 14 is a diagram illustrating an example of a timing chart of a part of a display device according to an embodiment.

FIG. 14 is a diagram illustrating an example of a timing chart in a case where the fifth circuit 22 controls the switch 18 using an offset voltage. The third circuit 16 applies the offset voltage to the pixel 100 before transferring a pixel signal indicating the light emission intensity for each pixel 100.

The third circuit 16 applies an offset voltage of a predetermined voltage Vth or more in a column belonging to the predetermined region 102 or in a normal display mode (display mode at high resolution). Then, after the offset voltage is applied, the transfer of the pixel signal is started.

In a mode for performing foveated rendering, the third circuit 16 applies an offset voltage less than the predetermined voltage Vth, for example, a ground voltage to the columns not belonging to the predetermined region 102. Then, the third circuit 16 may not output a signal to the column to be thinned after applying the offset voltage. The third circuit 16 may stop the operation of the circuit that executes output to the third signal line 160 connected to a target column. In this case, the target third signal line 160 may be connected to the ground voltage.

The third circuit 16 sets the predetermined voltage Vth in this manner and appropriately applies the offset voltage to the third signal line 160, so that the fifth circuit 22 can appropriately execute the switching of the switch 18.

Note that, in the present embodiment, an arbitrary method may be used as the method of forming the pixel signal. For example, the third circuit 16 may output a pixel signal by a pulse-shaped analog signal or may output a pixel signal in a ramp signal format. The similarity applies to the offset voltage, and the third circuit 16 may apply a rectangular wave-shaped offset voltage or a ramp signal-shaped offset voltage.

Ninth Embodiment

In each of the above-described embodiments, the display device 1 has been described. In the present embodiment, some non-limiting examples of the electronic device on which the display device 1 is mounted will be described.

Figure 15:
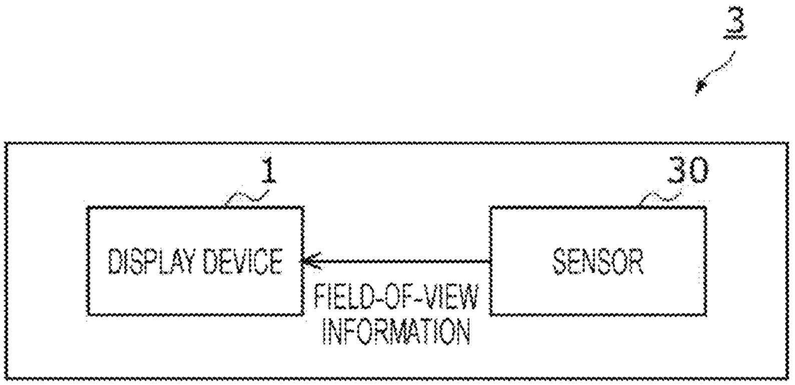
FIG. 15 is a view schematically illustrating an example of an electronic device including a display device according to an embodiment.

FIG. 15 is a view schematically illustrating a non-limiting example of an electronic device 3 including the display device 1. The electronic device 3 includes a display device 1 and a sensor 30.

The sensor 30 is a sensor that acquires information regarding a visual field of a person observing the display surface of the display device 1. The sensor 30 may include, for example, a laser and a light receiving element that track a direction of a pupil of a person. The laser and the light receiving element may have, for example, a form in which a relative position with respect to a display surface is known, or a form in which a relative position is measured by measurement before the operation of the display device 1 is started.

The sensor 30 senses which position or which region of the display surface the person is gazing at by tracking the direction in which the pupil of the person is facing. That is, the sensor 30 senses a position (pixel position) or area of the human visual field on a display surface. The information regarding the position of the visual field can be read from the estimation result obtained by estimating the direction of the line-of-sight of the person on the basis of the information obtained by tracking the movement of the eye, for example. The sensor 30 transmits the acquired information on the position to the display device 1.

As another example, the sensor 30 may output information regarding the direction of the line-of-sight of the person, and the display device 1 may estimate the position of the pixel in the direction of the line-of-sight.

The display device 1 generates a signal for appropriately driving the switch 18 on the basis of the information received from the sensor 30.

In a case where the display device 1 includes the fourth circuit 20, for example, the display device 1 sets a surrounding region including a pixel 100 as a predetermined region 102 with the position of the subject pixel 100 corresponding to the direction in which the line-of-sight of the person is directed as the center. The display device 1 may set a region starting from the second signal line 140 in the line direction as the predetermined region 102.

Furthermore, in a case where the sensor 30 outputs information regarding the direction of the line-of-sight, the display device 1 may calculate the pixel 100 to be the center of the predetermined region 102 from the received information regarding the direction of the line-of-sight, and set the predetermined region 102 from the pixel 100.

As described above, the display device 1 sets the region including the pixel 100 corresponding to the direction in which the line-of-sight of the person is directed as the predetermined region 102. The fourth circuit 20 may acquire the position of the predetermined region based on the output of the sensor 30, and perform control to selectively switch the switch 18 on the basis of the position of the predetermined region 102. In the display device 1, the fourth circuit 20 may estimate the predetermined region 102 on the basis of the output from the sensor 30.

In the case where the display device 1 includes the fifth circuit 22, the display device 1 sets the predetermined region 102 by the signal output from the third circuit 16 on the basis of the signal received from sensor 30. A driver upstream of the third circuit 16 or the third circuit 16 acquires the position of the pixel 100 belonging to the predetermined region 102 from the output of the sensor 30, and appropriately distributes a signal for controlling the light emission intensity of the pixel having the voltage equal to or higher than the predetermined voltage Vth and a signal having the voltage lower than the predetermined voltage Vth to each of the third signal lines 160 on the basis of the position of the predetermined region. As a result, the fifth circuit 22 can appropriately switch the switch 18 on the basis of the voltage applied to the third signal line 160.

The display device 1 may be used as, for example, a display device used for XR such as VR and AR. In this case, in a case where display is performed for each of the left and right eyes, the display devices 1 may be provided for the left and right eyes, and control may be performed in synchronization. One display device 1 having display regions for the left and right eyes may be provided. Furthermore, the sensor 30 and the display device 1 may acquire information regarding one predetermined region from the information on the left and right eyes, or may acquire information regarding the predetermined region for each eye.

As described above, some embodiments relating to the display device 1 in the present disclosure have been described. However, also in the first circuit 12, processing of thinning out signals of the first signal lines 120 for each predetermined number of times, such as appropriate doubler processing, is executed. Also in the first circuit 12, for example, information regarding a predetermined region from the sensor 30 is acquired, and processing of thinning out signals such as doubler processing is executed by the first signal line 120 belonging to the predetermined region and the first signal line 120 not belonging to the predetermined region on the basis of the information.

For example, the first circuit 12 may have a form in which the first signal lines 120 are appropriately short-circuited to each other with respect to the first signal lines 120 that do not belong to a predetermined region, and signals having the same light emission intensity are input from the second circuit 14 or the third circuit 16 to the pixels 100 that belong to a predetermined number of lines at the same timing, or may execute other appropriate control.

Hereinafter, some non-limiting examples of the pixel 100 in the display device 1 will be described.

Figure 16:
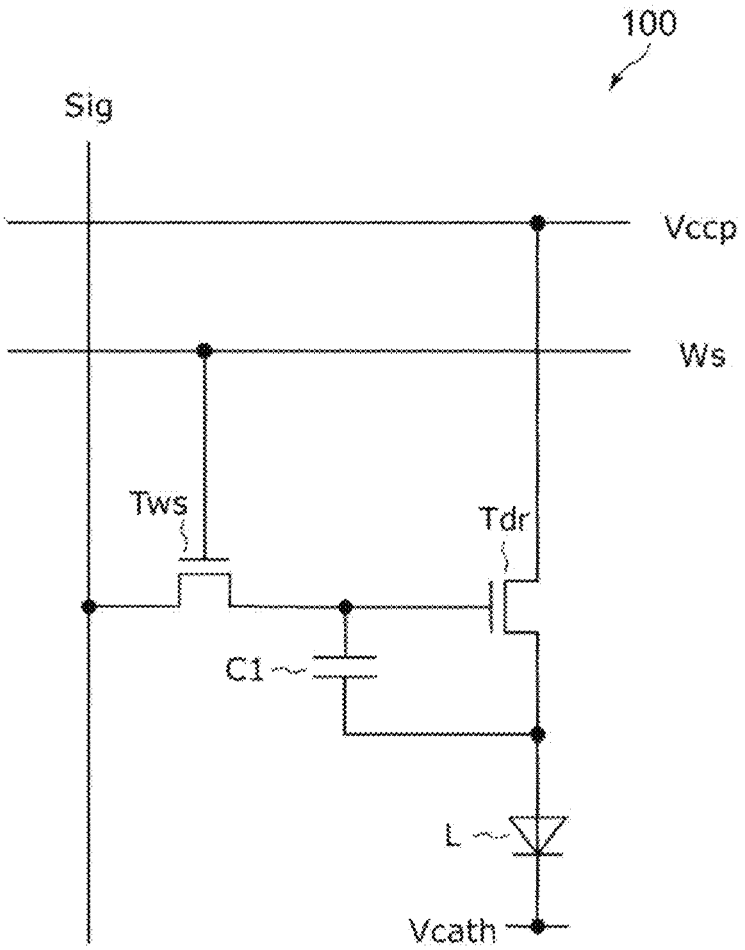
FIG. 16 is a diagram schematically illustrating an example of a pixel circuit according to an embodiment.

FIG. 16 is a diagram illustrating a non-limiting example of the pixel circuit of the pixel 100. A signal line Ws corresponds to the first signal line 120, and a signal line Sig corresponds to the second signal line 140 or the third signal line 160. The pixel 100 includes a light emitting element L, transistors Tws and Tdr, and a capacitor C1.

The light emitting element L emits light, for example, when a current flows from an anode to a cathode. The cathode is connected to a reference voltage Vcath (for example, the ground voltage). An anode of the light emitting element L is connected to a source of a transistor Tdr and one terminal of the capacitor C1.

A transistor Tws is, for example, an n-type metal-oxide-semiconductor field-effect transistor (MOSFET), and is a write transistor that controls writing of a pixel value. The transistor Tws has a drain receiving a data voltage (signal indicating light emission intensity of the pixel 100) indicating a pixel value from the signal line Sig, a source connected to the other end of the capacitor C1 and a gate of the transistor Tdr, and a gate receiving a control signal for write control from the signal line Ws. In addition to the signal indicating the light emission intensity of the pixel 100, the offset voltage in the above-described embodiment may be applied to the drain of the transistor Tws at an appropriate timing.

The transistor Tws writes a data voltage supplied from the signal line Sig to the capacitor C1 according to a control signal from the signal line Ws. When the transistor Tws is turned on, the capacitor C1 is charged (written) with the data voltage supplied from the signal line Sig, and the light emission intensity of the light emitting element L is controlled by the charge amount of the capacitor C1.

The transistor Tdr is, for example, an n-type MOSFET, and is a drive transistor that controls driving of the light emitting element L by causing a current based on the potential written in the capacitor C1 to flow. The transistor Tdr has a drain connected to a power supply voltage Vccp for driving the MOSFET, a gate connected to the source of the transistor Tws, and a source connected to the anode of the light emitting element L. In addition, the capacitor C1 is arranged between the gate and the source of the transistor Tdr.

As an example of a simple implementation, the pixel 100 emits light with an appropriate intensity based on the data voltage input from the signal line Sig by causing a write to the capacitor C1 sampled on the basis of the data voltage input from the signal line Sig that determines the light emission intensity for each pixel in this manner and a drain current corresponding to the intensity of the written signal to the light emitting element L to flow.

In the configuration of the pixel 100, in addition to the first circuit 12 and the second circuit 14 or the third circuit 16 that apply the voltage of the signal line Ws (the first signal line 120) and the signal line Sig (the second signal line 140 or the third signal line 160), the fourth circuit 20 or the fifth circuit 22 and the switch 18 are appropriately arranged, and the operation in each embodiment described above is executed.

Figure 17:
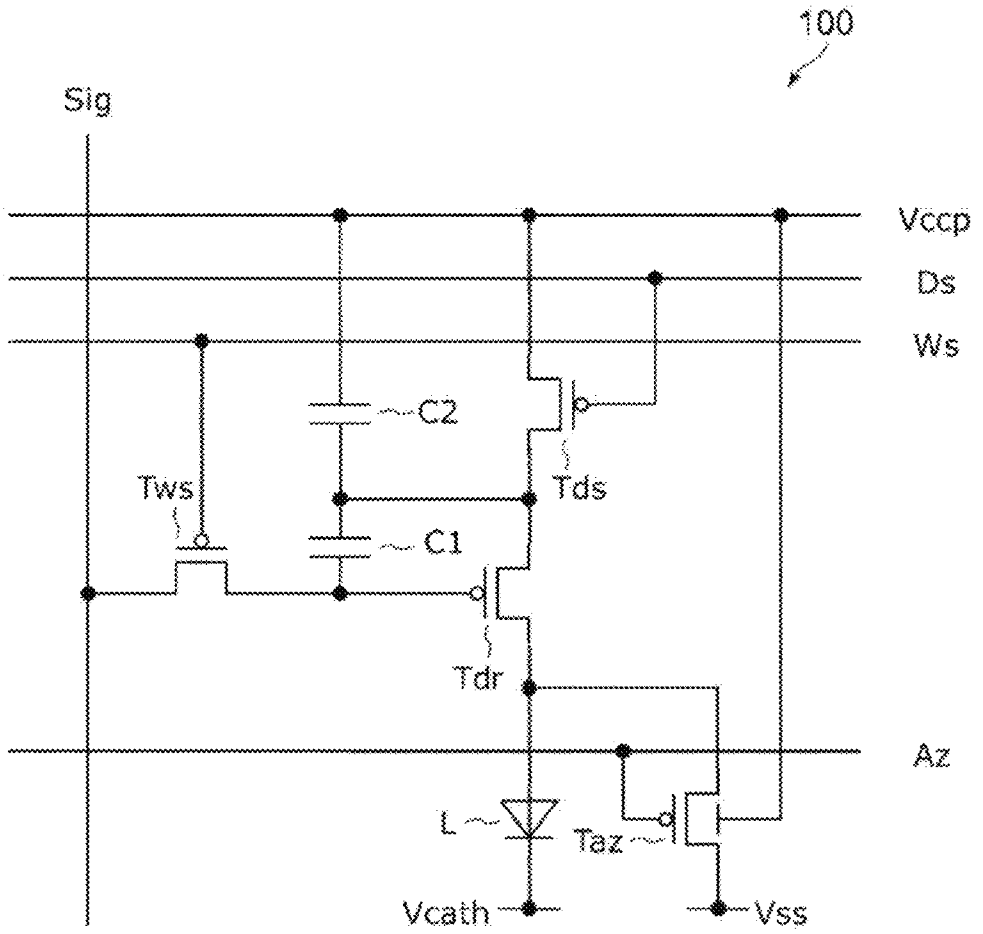
FIG. 17 is a diagram schematically illustrating an example of a pixel circuit according to an embodiment.

FIG. 17 is a diagram illustrating another example of the pixel 100. In FIG. 17, the pixel 100 further includes transistors Tds and Taz and a capacitor C2. Note that, in the following drawings, description overlapping with description of the pixel 100 according to another example described above may be omitted.

The anode of the light emitting element L is connected to a source of a transistor Taz and the drain of the transistor Tdr.

The capacitors C1 and C2 are capacitors for controlling the potential on the anode side of the light emitting element L. The capacitor C2 has one end connected to the power supply voltage Vccp and the other end connected to one end of the capacitor C1 and the drain of the transistor Tds. The other end of the capacitor C1 is connected to the drain of the transistor Tws and the gate of the transistor Tdr. The capacitors C1 and C2 sample the data voltage input from the signal line Sig on the basis of the signal input from the signal line Ws, and perform charging according to the data voltage.

The transistor Tws is, for example, a p-type MOSFET, and is a transistor that controls writing of a pixel value. The transistor Tws has a source receiving a data voltage indicating a pixel value from the signal line Sig, a drain connected to the other end of the capacitor C1 and a gate of the transistor Tdr, and a gate receiving a signal for write control from the signal line Ws.

The transistor Tws causes a drain current according to the voltage applied from the signal line Sig to flow on the basis of the signal from the signal line Ws, and controls writing to the capacitor C1. When the transistor Tws is turned on, a voltage based on the magnitude of the data voltage input from the signal line Sig is charged (written) in the capacitor C1, and the light emission intensity of the light emitting element L is controlled by the charge amount of the capacitor C1.

The transistor Tds is, for example, a p-type MOSFET, and is a transistor that causes a current based on a potential corresponding to a written pixel value to flow and controls driving of the light emitting element L. The transistor Tds has a source connected to the power supply voltage Vccp, a drain connected to a source of the transistor Tdr, and a gate to which a drive signal is applied from a signal line Ds. The transistor Tds causes a drain current to flow according to a drive signal applied from the signal line Ds, and controls a drain potential of the transistor Tdr.

The transistor Tdr is, for example, a p-type MOSFET, and causes a current based on the data voltage written by the transistor Tws to flow to the light emitting element L by driving the transistor Tdr. The transistor Tdr has a source connected to the drain of the transistor Tds, a drain connected to the anode of the light emitting element L, and a gate connected to the drain of the transistor Tws.

Since the data voltage stored by the capacitor C1 is applied to the gate of the transistor Tdr, the potential of the source becomes a sufficiently large value, so that a drain current corresponding to the data voltage flows. When the transistor Tdr causes the drain current to flow, the light emitting element L emits light with intensity (luminance) corresponding to the data signal input from the signal line Sig.

The transistor Taz is, for example, a p-type MOSFET, and has a source connected to the anode of the light emitting element L, a drain connected to the power supply voltage Vss, and a gate to which a reset voltage from the signal line Az is applied. The transistor Taz is an initialization transistor (reset transistor) that initializes the potential of the anode of the light emitting element L according to the reset voltage applied from the signal line Az. The voltage Vss is, for example, a reference voltage in the power supply voltage, and may be a ground voltage.

At the timing after the light emission, the transistor Taz resets the potential of the anode of the light emitting element L, so that a quick discharge operation can be realized and the written state can be initialized.

Similarly to the pixel 100 in FIG. 16, the operation of each of the above-described embodiments can be realized also in the pixel having such a configuration.

Figure 18:
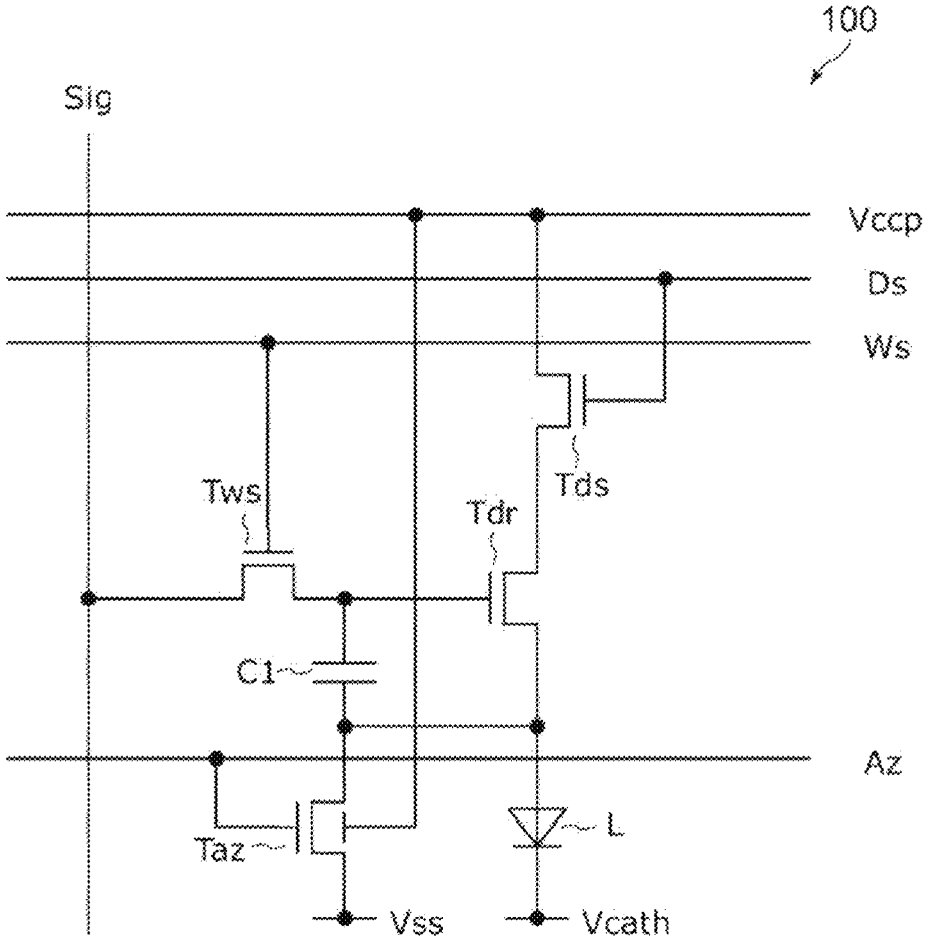
FIG. 18 is a diagram schematically illustrating an example of a pixel circuit according to an embodiment.

FIG. 18 is a diagram illustrating another example of the pixel 100. The pixel 100 may include a light emitting element L, transistors Tws, Tds, Tdr, and Taz, and a capacitor C1.

An anode of the light emitting element L is connected to one of a drain of the transistor Taz, a source of the transistor Tdr, and the capacitor C1.

The transistor Taz is, for example, an n-type MOSFET, and has a drain connected to the anode of the light emitting element L, a source connected to the power supply voltage Vss, and a gate to which a reset voltage is applied from the signal line Az. The transistor Taz is an initialization transistor that initializes the potential of the anode of the light emitting element L according to the reset voltage applied from the signal line Az.

The capacitor C1 is a capacitor for controlling the potential on the anode side of the light emitting element L.

The transistor Tws is, for example, a p-type MOSFET, and is a transistor that controls writing of a pixel value. The transistor Tws has a drain to which a data voltage indicating a pixel value is input from the signal line Sig, a source connected to the other end of the capacitor C1 and a gate of the transistor Tdr, and a gate to which a signal for write control is applied from the signal line Ws.

The transistor Tws causes a drain current according to a data voltage applied from the signal line Sig according to a signal from the signal line Ws to flow, and controls writing to the capacitor C1. When the transistor Tws is turned on, the capacitor C1 is charged with a voltage according to the magnitude of a data voltage input from the signal line Sig, and the light emission intensity of the light emitting element L is controlled by the charge amount of the capacitor C1.

The transistor Tds is, for example, an n-type MOSFET, and is a transistor that causes a current based on a potential corresponding to a written pixel value to flow and controls driving of the light emitting element L. The transistor Tds has a drain connected to the power supply voltage Vccp, a source connected to the drain of the transistor Tdr, and a gate to which a drive signal is applied from the signal line Ds. The transistor Tds causes a drain current to flow according to a drive signal applied from the signal line Ds, and controls a drain potential of the transistor Tdr.

The transistor Tdr is, for example, an n-type MOSFET, and causes a current based on a data signal written by the transistor Tws to flow to the light emitting element L through driving of the transistor Tdr. The transistor Tdr has a drain belonging to the source of the transistor Tds and a source connected to the anode of the light emitting element L.

Since the potential corresponding to the data voltage stored by the capacitor C1 is applied to the gate of the transistor Tdr, the transistor Tdr causes a drain current corresponding to the data voltage to flow by the drain potential having a sufficiently large value. When the transistor Tdr causes the drain current to flow, the light emitting element L emits light with an intensity corresponding to a data signal input from the signal line Sig.

At the timing after the light emission, the potential of the anode of the light emitting element L is reset by the transistor Taz as in the above case.

Similarly to the pixel 100 described above, the operation of each embodiment described above can be realized also in the pixel having such a configuration.

Figure 19:
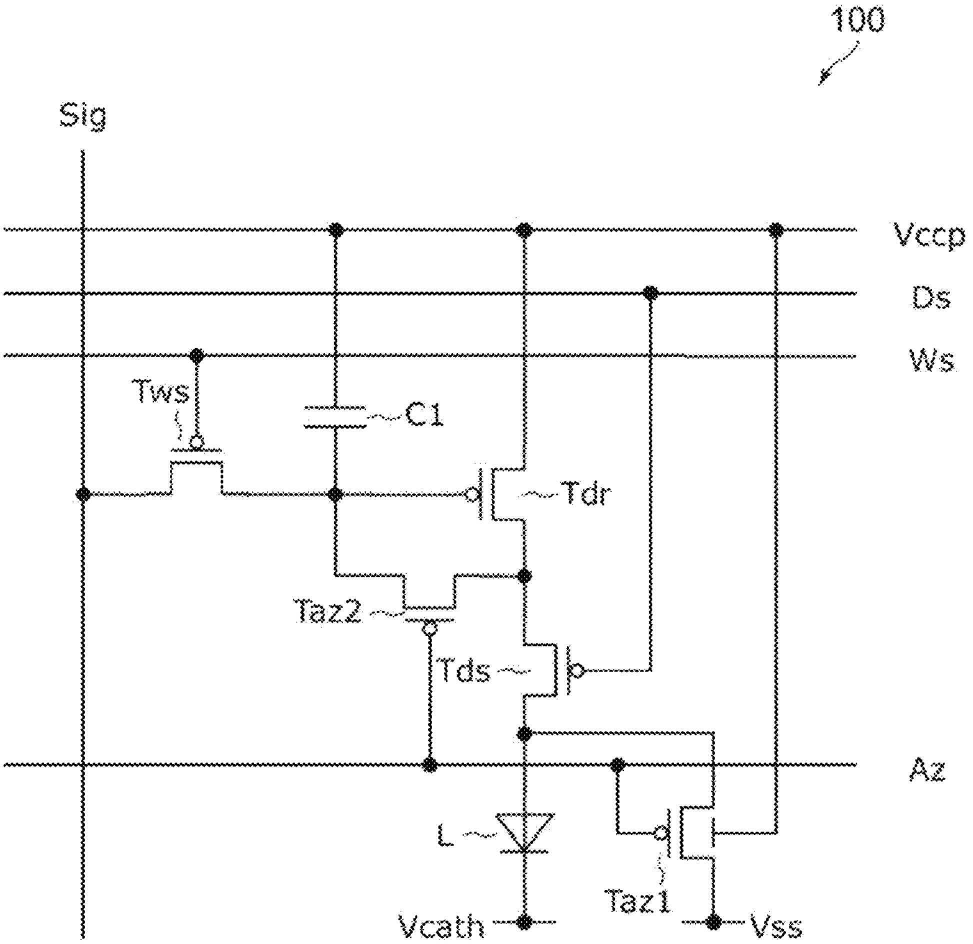
FIG. 19 is a diagram schematically illustrating an example of a pixel circuit according to an embodiment.

FIG. 19 is a diagram illustrating another example of the pixel 100. The pixel 100 may include two transistors of transistors Taz1 and Taz2 as initialization transistors. As described above, even in a case where a plurality of initialization transistors is provided, similar control can be executed, and power consumption can be suppressed while appropriately realizing foveated rendering.

Similarly to the pixel 100 described above, the operation of each embodiment described above can be realized also in the pixel having such a configuration.

Figure 20:
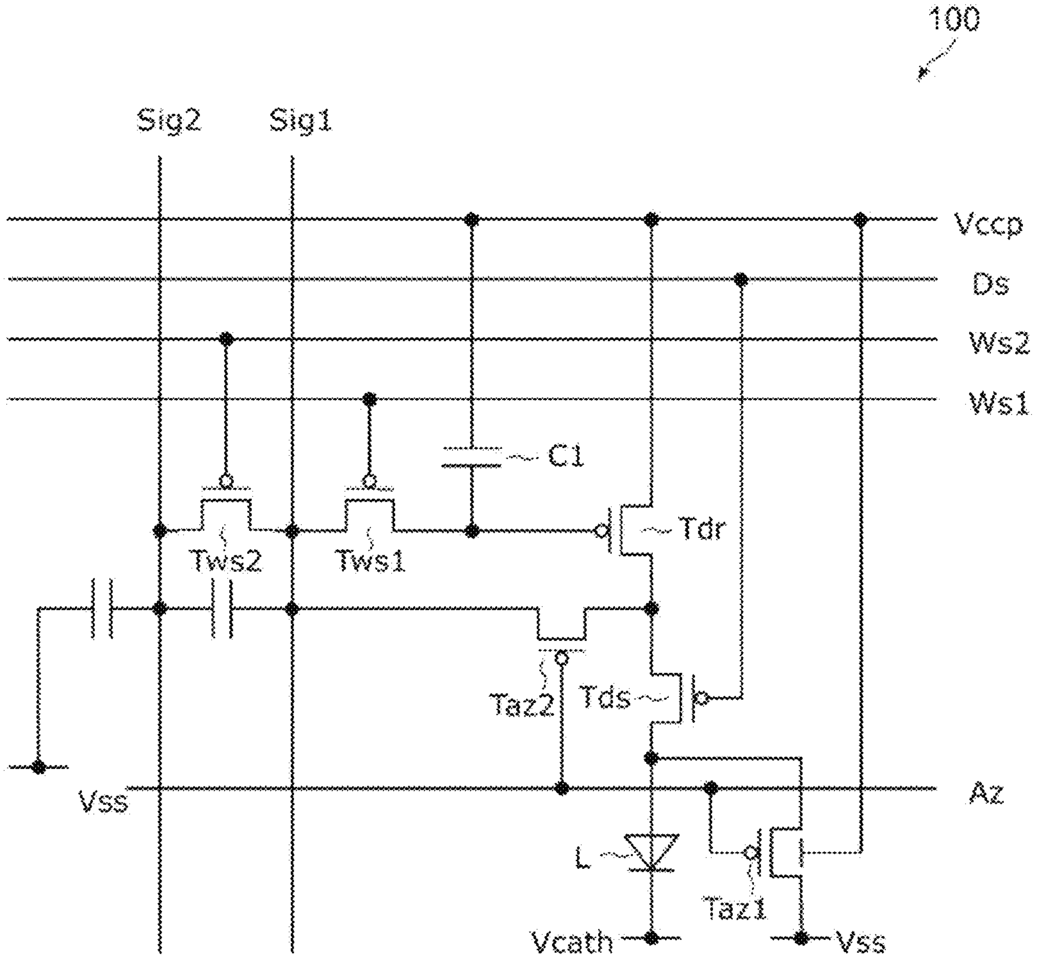
FIG. 20 is a diagram schematically illustrating an example of a pixel circuit according to an embodiment.

FIG. 20 is a diagram illustrating another example of the pixel 100. In the pixel 100, signals indicating intensity may be transmitted by two systems of signal lines Sig1 and Sig2. In this case, the second signal lines 140 corresponding to the signal lines Sig1 and Sig2 may be connected to the pixels 100 from the second circuit 14, and the third signal lines 160 corresponding to the signal lines Sig1 and Sig2 may be connected to the pixels 100 from the third circuit 16.

The data voltage applied to the signal line Sig1 is written to the capacitor C1 by the transistor Tws1 controlled by the signal applied to the signal line Ws1, and further, in a state where the transistor Tws1 is driven, the data voltage applied to the signal line Sig2 can be written to the capacitor C1.

Similarly to the pixel 100 described above, the operation of each embodiment described above can be realized also in the pixel having such a configuration.

Figure 21:
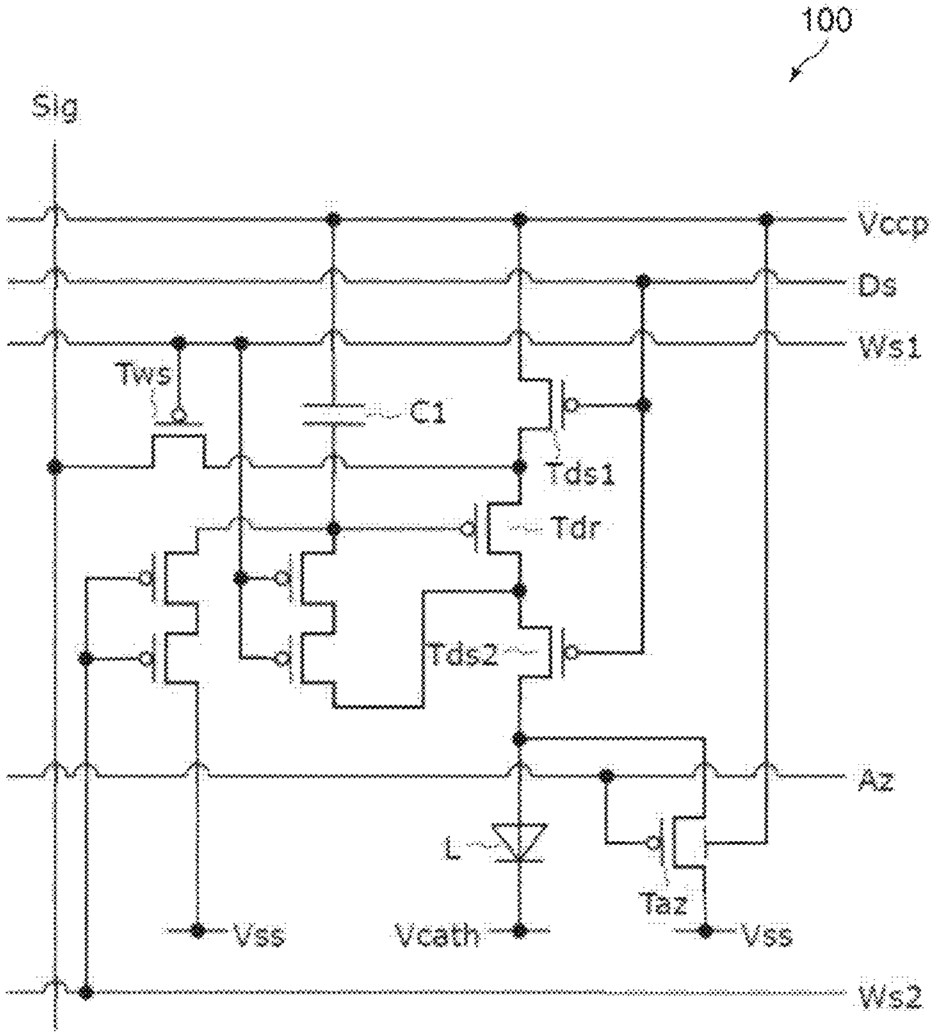
FIG. 21 is a diagram schematically illustrating an example of a pixel circuit according to an embodiment.

FIG. 21 is a diagram illustrating another example of the pixel 100. The pixel 100 may be connected to two types of signal lines Ws1 and Ws2 that control sampling of the data voltage. In this configuration, for example, the driving of the transistor Tdr is controlled on the basis of the control signal of the line one line before. As described above, signals of two systems from the first circuit 12 may be input as control signals to the pixels 100 belonging to one line.

Similarly to the pixel 100 described above, the operation of each embodiment described above can be realized also in the pixel having such a configuration.

Figure 22:
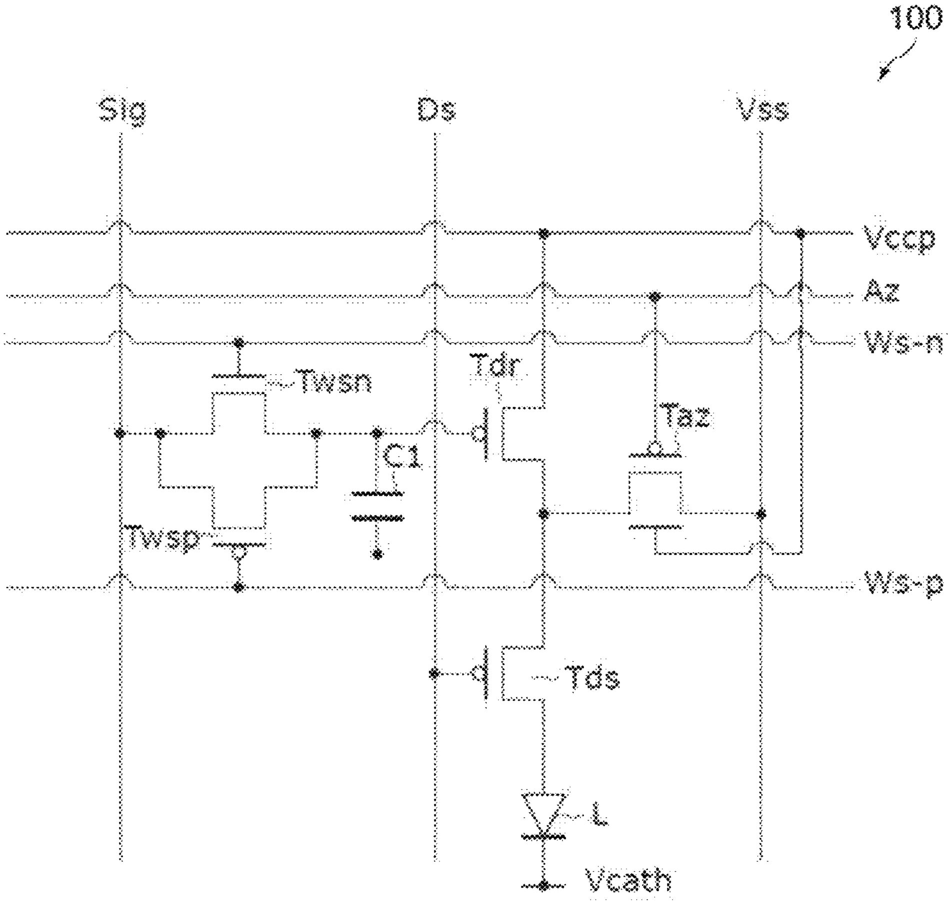
FIG. 22 is a diagram schematically illustrating an example of a pixel circuit according to an embodiment.

FIG. 22 is a diagram illustrating another example of the pixel 100. The pixel 100 may control the write transistor by two transistors Twsn and Twsp that perform complementary driving. A write signal for driving an n-type MOSFET is applied from a signal line Ws-n to a gate of the transistor Twsn, and a write signal for driving a p-type MOSFET is applied from a signal line Ws-p to a gate of the transistor Twsp. As described above, even in a case where the signal lines Ws-n and Ws-p are provided as the first signal lines 120, similar arrangement and control can be performed.

Similarly to the pixel 100 described above, the operation of each embodiment described above can be realized also in the pixel having such a configuration.

Some examples above illustrate non-limiting examples of the pixel 100, and the pixel 100 may have other configurations. Furthermore, in the example of the pixel 100, the polarities of the MOSFET are defined as n-type and p-type, but these polarities can be arbitrarily selected as long as the pixel 100 appropriately emits light with intensity based on the data voltage.

APPLICATION EXAMPLES OF THE DISPLAY DEVICE 1 ACCORDING TO THE PRESENT DISCLOSURE

First Application Example

The electronic device 3 or the display device 1 according to the present disclosure can be used for various purposes.

Figure 23A:
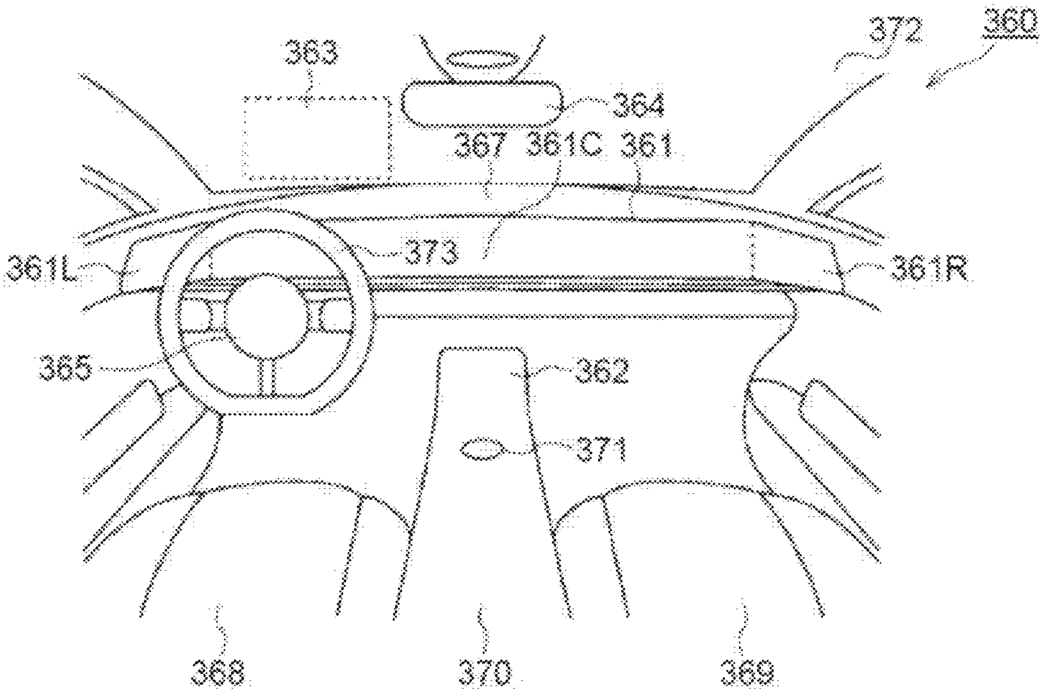
FIG. 23A is a view illustrating an internal state of a vehicle from a rear side to a front side of the vehicle.
Figure 23B:
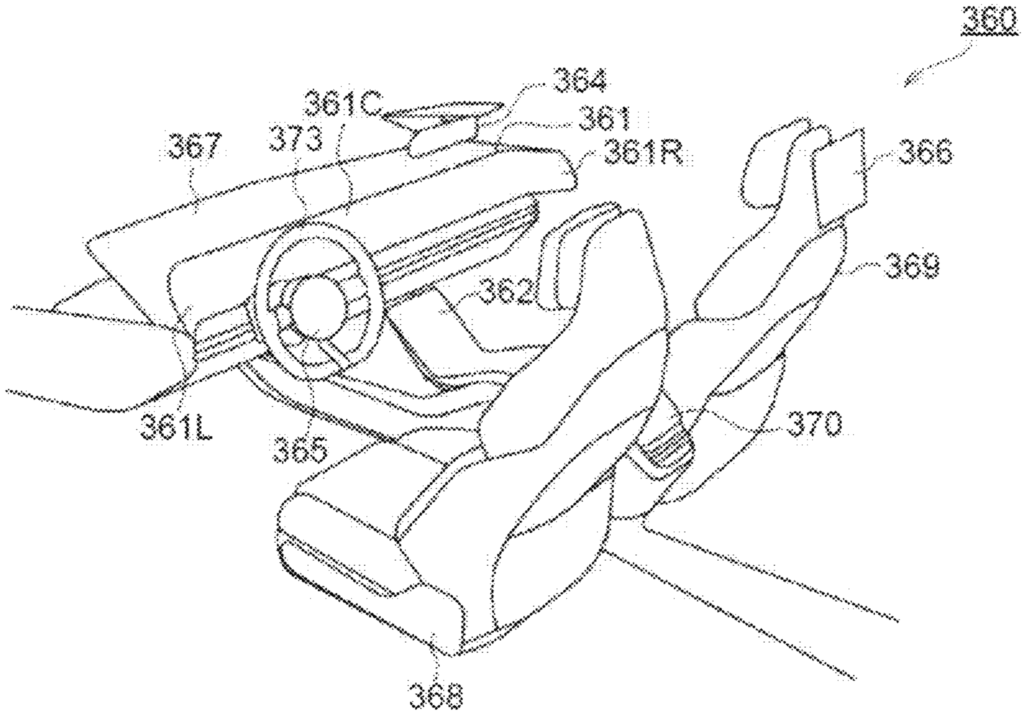
FIG. 23B is a view illustrating an internal state of a vehicle from an oblique rear to an oblique front of the vehicle.

FIGS. 23A and 23B are diagrams illustrating an internal configuration of a vehicle 360 which is a first application example of the electronic device 3 including the display device 1 according to the present disclosure. FIG. 23A is a view illustrating an internal state of vehicle 360 from a rear side to a front side of vehicle 360, and FIG. 23B is a view illustrating an internal state of vehicle 360 from an oblique rear side to an oblique front side of the vehicle 360.

The vehicle 360 in FIGS. 23A and 23B includes a center display 361, a console display 362, a head-up display 363, a digital rear mirror 364, a steering wheel display 365, and a rear entertainment display 366.

The center display 361 is disposed on a dashboard 367 at a location facing a driver's seat 368 and a passenger seat 369. FIG. 23 illustrates an example of the center display 361 having a horizontally long shape extending from the driver seat 368 side to the passenger seat 369 side, but any screen size and arrangement location of the center display 361 may be adopted. The center display 361 can display information sensed by various sensors. As a specific example, the center display 361 can display an image captured by an image sensor, an image of the distance to an obstacle in front of or on a side of the vehicle, the distance being measured by a ToF sensor, a passenger's body temperature detected by an infrared sensor, and the like. The center display 361 can be used to display, for example, at least one piece of safety-related information, operation-related information, a lifelog, health-related information, authentication/identification-related information, or entertainment-related information.

The safety-related information is information of doze sensing, looking-away sensing, sensing of mischief of a child riding together, presence or absence of wearing of a seat belt, sensing of leaving of an occupant, and the like, and is information sensed by the sensor arranged to overlap with a back surface side of the center display 361, for example. The operation-related information senses a gesture related to an operation by an occupant, using a sensor. Gestures to be sensed may include an operation of various kinds of equipment in the vehicle 360. For example, operations of air conditioning equipment, a navigation device, an AV device, a lighting device, and the like are detected. The lifelogs include lifelogs of all the occupants. For example, the life log includes an action record of each occupant in the vehicle. By acquiring and storing the life log, it is possible to check a state of the occupant at a time of an accident. In the health-related information, the health condition of the occupant is estimated on the basis of the body temperature of the occupant detected by using a temperature sensor. Alternatively, the face of the occupant may be imaged by using an image sensor, and the health condition of the occupant may be estimated from the imaged facial expression. Further, a conversation may be made with an occupant in automatic voice, and the health condition of the occupant may be estimated on the basis of the contents of a response from the occupant. The authentication/identification-related information includes a keyless entry function of performing face authentication using a sensor, and a function of automatically adjusting a seat height and position through face identification. The entertainment-related information includes a function of detecting, with a sensor, operation information about an AV device being used by an occupant, and a function of recognizing the face of the occupant with sensor and providing content suitable for the occupant through the AV device.

The console display 362 can be used to display lifelog information, for example. The console display 362 is disposed near a shift lever 371 of a center console 370 between the driver's seat 368 and the passenger seat 369. The console display 362 can also display information detected by various sensors. Furthermore, the console display 362 may display an image of the surroundings of the vehicle captured with an image sensor, or may display an image of the distance to an obstacle in the surroundings of the vehicle.

The head-up display 363 is virtually displayed behind a windshield 372 in front of the driver's seat 368. The head-up display 363 can be used to display at least one piece of the safety-related information, the operation-related information, the lifelog, the health-related information, the authentication/identification-related information, or the entertainment-related information, for example. Being virtually disposed in front of the driver's seat 368 in many cases, the head-up display 363 is suitable for displaying information directly related to operations of the vehicle 360, such as the speed, the remaining amount of fuel (battery), and the like of the vehicle 360.

The digital rear mirror 364 can not only display the rear of the vehicle 360 but also display the state of an occupant in the rear seat, and thus, can be used to display the lifelog information by disposing a sensor on the back surface side of the digital rear mirror 364 in an overlapping manner, for example.

The steering wheel display 365 is disposed near the center of a steering wheel 373 of the vehicle 360. The steering wheel display 365 can be used to display at least one piece of the safety-related information, the operation-related information, the lifelog, the health-related information, the authentication/identification-related information, or the entertainment-related information, for example. In particular, being located close to the driver's hands, the steering wheel display 365 is suitable for displaying the lifelog information such as the body temperature of the driver, or for displaying information regarding operations of the AV device, the air conditioning equipment, or the like.

The rear entertainment display 366 is attached to the back side of the driver's seat 368 or the passenger seat 369, and is an occupant in the rear seat to enjoy viewing/listening. The rear entertainment display 366 can be used to display at least one piece of the safety-related information, the operation-related information, the lifelog, the health-related information, the authentication/identification-related information, or the entertainment-related information, for example. In particular, as the rear entertainment display 366 is located in front of the occupant in the rear seat, information related to the occupant in the rear seat is displayed. For example, information regarding an operation of the AV device or the air conditioning equipment may be displayed, or a result of measurement of the body temperature or the like of an occupant in the rear seat with a temperature sensor may be displayed.

As described above, the sensor 5 is arranged to overlap with the back surface side of the image display device 1, so that a distance to an object that is present in the surroundings can be measured. Optical distance measurement methods are roughly classified into a passive type and an active type. By a method of the passive type, distance measurement is performed by receiving light from an object, without projecting light from a sensor to the object. Methods of the passive type include a lens focus method, a stereo method, and a monocular vision method. Methods of the active type include distance measurement that is performed by projecting light onto an object, and receiving reflected light from the object with a sensor to measure the distance. Methods of the active type include an optical radar method, an active stereo method, an illuminance difference stereo method, a moire topography method, and an interference method. The electronic device 3 according to the present disclosure is applicable to any of these types of distance measurement. With the use of the sensor disposed to overlap the back surface side of the electronic device 3 according to the present disclosure, the above-described passive or active distance measurement can be performed.

Second Application Example

The electronic device 3 including the display device 1 according to the present disclosure is applicable not only to various displays used in vehicles but also to displays mounted on various electronic devices.

Figure 24A:
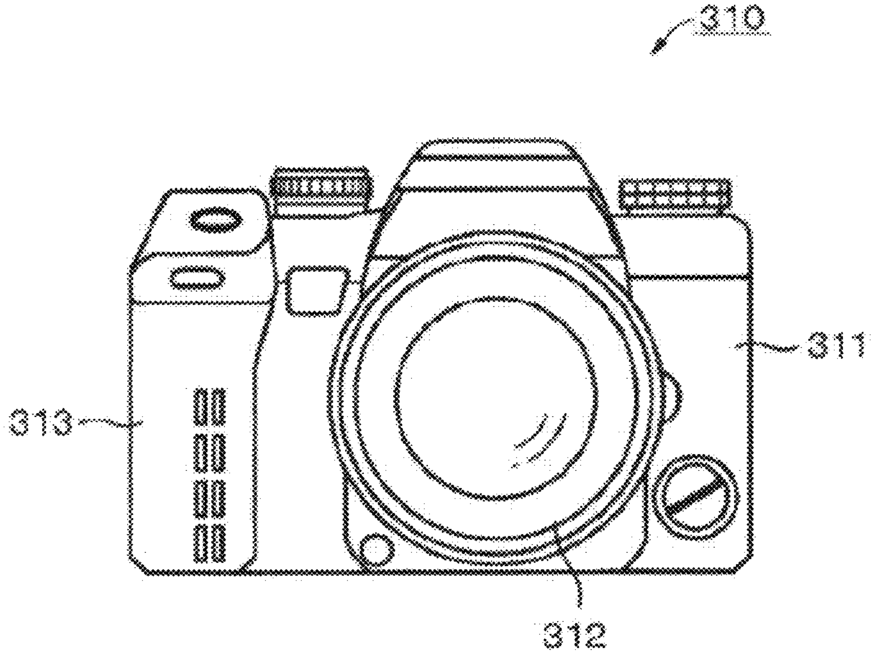
FIG. 24A is a front view of a digital camera as a second application example of an electronic device.
Figure 24B:
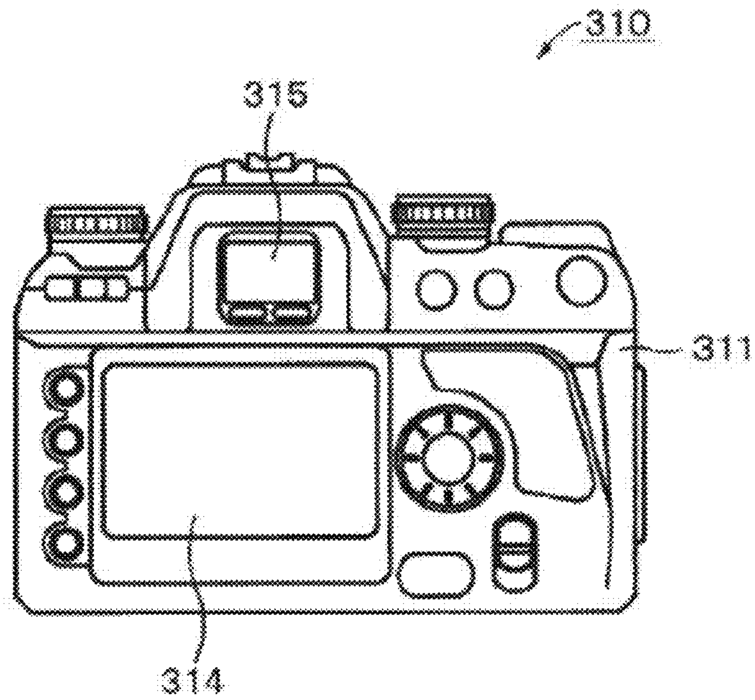
FIG. 24B is a rear view of the digital camera.

FIG. 24A is a front view of a digital camera 310 that is a second application example of the electronic device 3, and FIG. 24B is a rear view of the digital camera 310. The digital camera 310 in FIGS. 24A and 24B illustrates an example of a single-lens reflex camera in which a lens 121 is replaceable, but is also applicable to a camera in which the lens 121 is not replaceable.

In the cameras of FIGS. 24A and 24B, when a photographer looks into an electronic viewfinder 315 to determine the composition while holding a grip 313 of a camera body 311, and presses a shutter while adjusting the focus, the photographing data is stored in the memory in the camera. As illustrated in FIG. 24B, a monitor screen 316 that displays captured data and the like, a live image, and the like, and an electronic viewfinder 315 are provided on the back side of the camera. Furthermore, there is a case where a sub screen that displays setting information such as a shutter speed and an exposure value is provided on the upper surface of the camera.

The electronic device 3 according to the present disclosure can be used by disposing a sensor on a back surface side of the monitor screen 316, the electronic viewfinder 315, the sub screen, or the like used for a camera in an overlapping manner.

Third Application Example

The electronic device 3 according to the present disclosure is also applicable to a head mounted display (hereinafter, referred to as an HMD). An HMD can be used for VR, AR, mixed reality (MR), substitutional reality (SR), or the like.

Figure 25A:
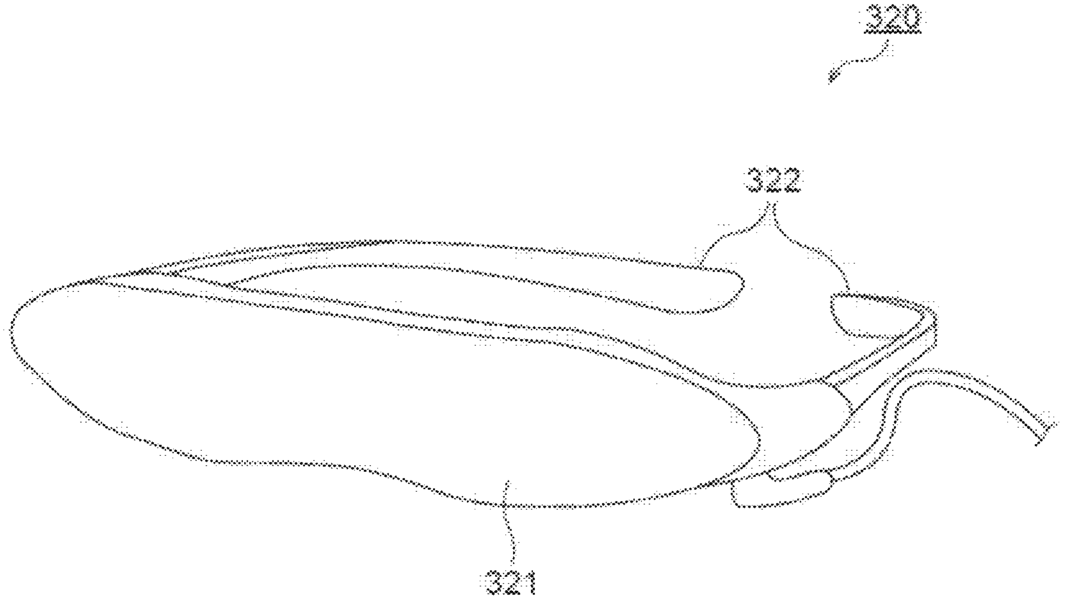
FIG. 25A is an external view of an HMD which is a third application example of the electronic device.

FIG. 25A is an external view of an HMD320 which is a third application example of the electronic device 3. The HMD320 of FIG. 25A has an attachment member 322 for attachment so as to cover human eyes. The attachment members 322 are hooked and secured to human ears, for example. A display device 321 is provided inside the HMD 320, and the wearer of the HMD 320 can visually recognize a stereoscopic image and the like with the display device 321. The HMD 320 includes a wireless communication function and an acceleration sensor, for example, and can switch stereoscopic images or the like displayed on the display device 321 in accordance with a posture, a gesture, or the like of the wearer.

Furthermore, a camera may be disposed in the HMD 320 to capture an image around the wearer, and an image obtained by combining the image captured by the camera with an image generated by a computer may be displayed on the display device 321. For example, the camera is disposed to overlap with the back surface side of the display device 321 visually recognized by the wearer of the HMD 320, an image of the surroundings of the eyes of the wearer is captured with the camera, and the captured image is displayed on another display provided on the outer surface of the HMD 320, so that a person around the wearer can recognize the expression of the face and the movement of the eyes of the wearer in real time.

Figure 25B:
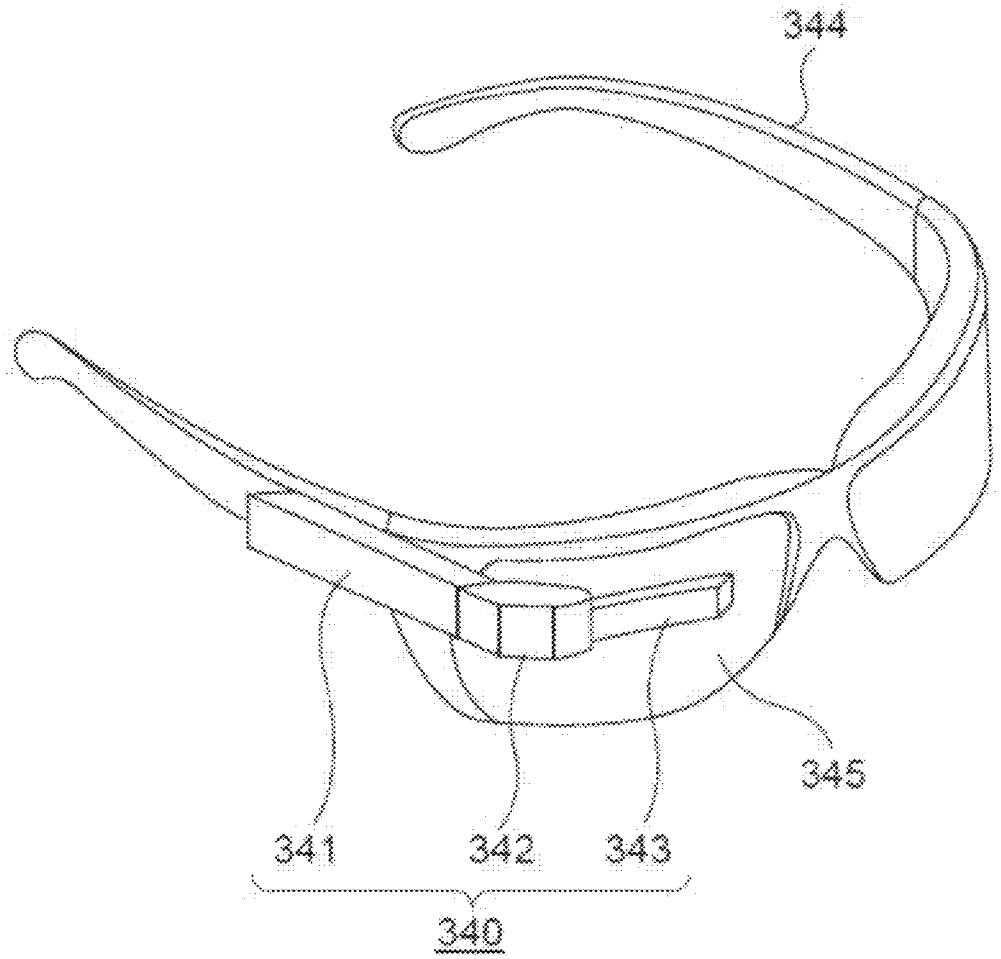
FIG. 25B is an external view of a smart glass.

Note that various kinds of HMD 320 are conceivable. For example, as illustrated in FIG. 25B, the electronic device 3 according to the present disclosure can also be applied to smart glasses 340 that display various types of information on glasses 344. The smart glass 340 in FIG. 25B includes a main body portion 341, an arm portion 342, and a lens barrel portion 343. The main body portion 341 is connected to the arm portion 342. The main body portion 341 is detachable from the glasses 344. The main body portion 341 includes a display unit and a control board for controlling operations of the smart glasses 340. The main body portion 341 and the lens barrel are connected to each other through the arm portion 342. The lens barrel portion 343 emits image light emitted from the main body portion 341 through the arm portion 342, to the side of lenses 345 of the glasses 344. This image light enters the human eyes through the lenses 345. Similarly to normal eyeglasses, a wearer of the smart glass 340 in FIG. 25B can visually recognize not only the surrounding situation but also various pieces of information emitted from the lens barrel portion 343.

Fourth Application Example

The electronic device 3 according to the present disclosure is also applicable to a television device (hereinafter, TV). In a today's TV, the frame tends to be as small as small, from the viewpoint of downsizing and design. Therefore, in a case where a camera to capture an image of a viewer is disposed on a TV, it is desirable to disposed the camera so as to overlap with the back surface side of a display panel 331 of the TV.

Figure 26:
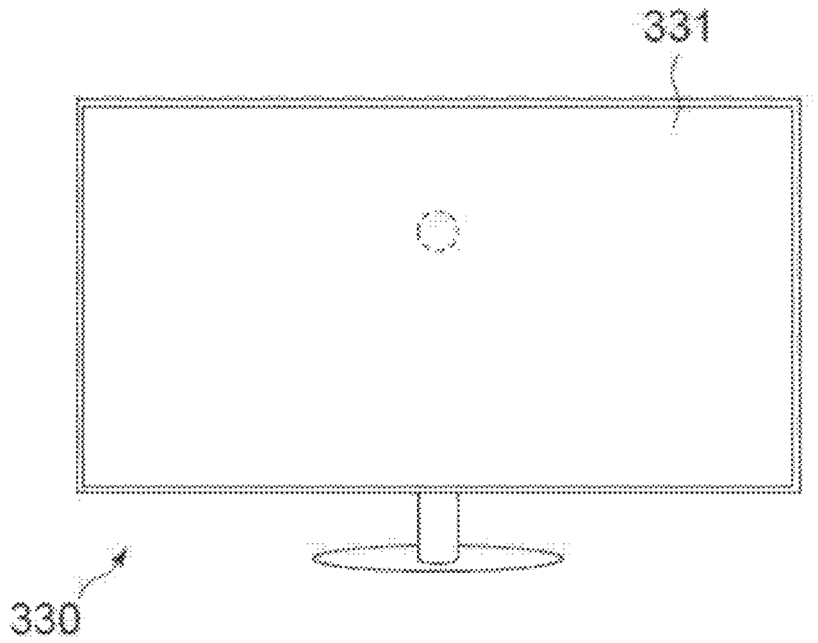
FIG. 26 is an external view of a TV which is a fourth application example of the electronic device.

FIG. 26 is an external view of a TV330 as a fourth application example of the electronic device 3. In the TV330 of FIG. 26, a frame is minimized, and almost the entire area on the front side is a display area. The TV 330 includes a sensor such as a camera to capture an image of the viewer. The sensor in FIG. 26 is disposed on a back side of a part (for example, a broken line part) in display panel 331. The sensor may be an image sensor module, or various sensors can be used such as a sensor for face authentication, a sensor for distance measurement, and a temperature sensor. A plurality of kinds of sensors may be disposed on the back surface side of the display panel 331 of the TV 330.

As described above, with the electronic device 3 of the present disclosure, an image sensor module can be disposed to overlap with the back surface side of the display panel 331. Accordingly, there is no need to dispose a camera or the like on the frame, the TV 330 can be downsized, and there is no possibility that the design is impaired by the frame.

Fifth Application Example

Figure 27:
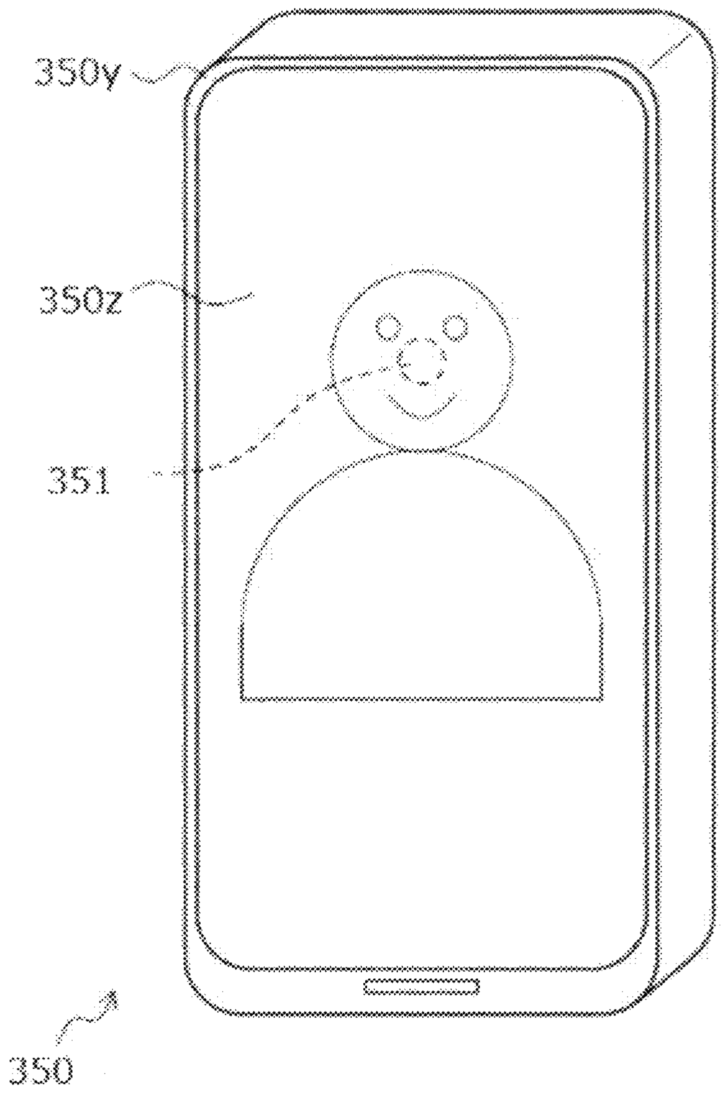
FIG. 27 is an external view of a smartphone which is a fifth application example of the electronic device.

The electronic device 3 according to the present disclosure is also applicable to a smartphone and a mobile phone. FIG. 27 is an external view of a smartphone 350 which is a fifth application example of the electronic device 3. In the example of FIG. 27, a display surface 350_z_ spreads close to an external size of electronic device 3, and a bezel 350_y_ around a display surface 350_z_ has a width of several mm or less. In general, a front camera is often mounted on a bezel 350_y_, but in FIG. 27, as indicated by a broken line, an image sensor module 351 serving as the front camera is arranged on, for example, the back surface side of a substantially central portion of a display surface 2*z*. As the front camera is disposed on the back surface side of the display surface 2*z* in this manner, there is no need to disposed the front camera on the bezel 350*y*, and thus, the width of the bezel 350*y* can be narrowed.

The embodiments described above may have the following modes.

(1)

A display device, including:

a plurality of pixels arranged in a two-dimensional array of lines and columns;

a first signal line extending along a direction of the line and connected to the plurality of pixels belonging to the line;

a first circuit connected to the first signal line;

a second signal line extending along a direction of the column and connected to the plurality of pixels belonging to the column;

a second circuit connected to the second signal line;

a third signal line extending along a direction of the column and connected to the plurality of pixels belonging to a column adjacent to the column to which the second signal line is connected;

a third circuit connected to the third signal line; and a switch configured to switch an electrical connection between the second signal line or the second circuit and the third signal line.

(2)

The display device according to (1), in which the first signal line is arranged for each line, and the second signal line and the third signal line connected through the switch are arranged every two columns.

(3)

The display device according to (1) or (2), in which the pixel includes a light emitting element that emits light of a plurality of colors, and the second signal line extends along a column direction for each of a plurality of colors with respect to the same pixel, and the third signal line extends along a column direction for each of a plurality of colors with respect to the same pixel, and is connectable to the second signal line connected to the light emitting elements of the same color through the switch.

(4)

The display device according to any one of (1) to (3), in which the first circuit outputs a signal for driving the pixel, the first circuit outputs a drive signal for each of the first signal lines to the first signal lines connected to the plurality of pixels belonging to a predetermined region, and the first circuit outputs a drive signal for each predetermined number of the first signal lines to the first signal lines not connected to the pixels belonging to the predetermined region.

(5)

The display device according to (4), in which the first circuit outputs a drive signal for performing doubler driving in the first signal line not connected to the pixel belonging to the predetermined region.

(6)

The display device according to any one of (1) to (5), in which the third signal line connected to the pixel belonging to the predetermined region is electrically disconnected from the second signal line, and the third signal line not connected to the pixel belonging to the predetermined region is electrically connected to the second signal line through the switch.

(7)

The display device according to (6), in which the third circuit does not output a signal for controlling the light emission intensity of the pixel to the third signal line not connected to the pixel belonging to the predetermined region.

(8)

The display device according to (6) or (7), further including a fourth circuit that switches the switch, in which the fourth circuit switches the switch, and electrically disconnects the third signal line connected to the pixel belonging to the predetermined region from the second signal line, and the fourth circuit connects the third signal line not connected to the pixel belonging to the predetermined region to the second circuit directly or through the second signal line.

(9)

The display device according to (6), further including a fifth circuit that is connected to the third circuit and compares a voltage output from the third circuit with a predetermined voltage, in which the third circuit outputs, to the third signal line connected to the pixel belonging to the predetermined region, a signal for controlling light emission intensity of the pixel of the predetermined voltage or higher, or a first offset voltage, and outputs, to the third signal line not connected to the pixel belonging to the predetermined region, a signal lower than the predetermined voltage or a second offset voltage, and the fifth circuit switches the switch on a basis of a result of the comparison to selectively connect the third signal line to the second circuit.

(10)

The display device according to (9), in which the fifth circuit switches the switch, and electrically disconnects the second signal line and the third signal line in a case where a voltage applied to the third signal line is equal to or higher than a predetermined voltage, and electrically connecting the second circuit and the third signal line directly or through the second signal line in a case where a voltage applied to the third signal line is less than a predetermined voltage.

(11)

The display device according to any one of (1) to (5), in which the switch switches connection between one of the second circuit and the third circuit, and the third signal line.

(12)

The display device according to (11), in which the second circuit is connected to the second signal line and the corresponding third signal line through the same amplifier.

(13)

An electronic device, including:

the display device according to (8); and a sensor that acquires a position of a line-of-sight of a person on the display device, in which the predetermined region is a region including the pixels corresponding to a direction in which the line-of-sight of a person is directed, and
the fourth circuit acquires a position of the predetermined area from an output of the sensor, and selectively switches the switch on the basis of the position of the predetermined area.

(13)

An electronic device, including:
the display device according to (9) or (10); and
a sensor that acquires a position of a line-of-sight of a person on the display device, in which
the predetermined region is a region including the pixels corresponding to a direction in which a line-of-sight of a person is directed, and
the third circuit acquires a position of the predetermined region from an output of the sensor, and outputs a signal for controlling light emission intensity of the pixel having a voltage equal to or higher than the predetermined voltage or a signal having a voltage lower than the predetermined voltage on a basis of the position of the predetermined region.

Aspects of the present disclosure are not limited to the above-described embodiments, and include various conceivable modifications. The effects of the present disclosure are not limited to the above-described contents. The components in each of the embodiments may be appropriately combined and applied. That is, various additions, modifications, and partial deletions can be made without departing from the conceptual idea and gist of the present disclosure derived from the contents defined in the claims and equivalents and the like thereof.

REFERENCE SIGNS LIST

1 Display device
10 Pixel array
100 Pixel
102 Predetermined region
12 First circuit
120 First signal line
14 Second circuit
140 Second signal line
142 Amplifier
16 Third circuit
160 Third signal line
162 Amplifier
18 Switch
20 Fourth circuit
22 Fifth circuit
3 Electronic device
30 Sensor

The invention claimed is:

1. A display device, comprising:
a plurality of pixels arranged in a two-dimensional array of rows and columns, the rows extending along a row direction and the columns extending along a column direction;
a first signal line extending along the row direction and connected to the plurality of pixels belonging to a respective row;
a first circuit connected to the first signal line;
a second signal line extending along a direction of the columns and connected to the plurality of pixels belonging to a respective column;
a second circuit connected to the second signal line;
a third signal line extending along the column direction and connected to the plurality of pixels belonging to another respective column;
a third circuit connected to the third signal line;
a switch circuit configured to switch electrical connections between the second circuit and the third signal line; and
a fourth circuit that switches the switch circuit, wherein
in a first state, the second circuit is connected to the second signal line and is disconnected from the third signal line,
in a second state, the second circuit is connected to both the second signal line and the third signal line,
the third signal line connected to a respective pixel belonging to a predetermined region is electrically disconnected from the second signal line,
the third signal line not connected to a respective pixel belonging to the predetermined region is electrically connected to the second signal line through the switch circuit,
the fourth circuit electrically disconnects the third signal line connected to the respective pixel belonging to the predetermined region from the second signal line, and
the fourth circuit connects the third signal line not connected to the respective pixel belonging to the predetermined region to the second circuit directly or through the second signal line.

2. The display device according to claim 1, wherein
the first signal line is one of a plurality of first signal lines respectively arranged for each of the rows, and
the second signal line and the third signal line connected through the switch circuit are arranged every two columns.

3. The display device according to claim 1, wherein
the pixels respectively include a light emitting element that emits light of a plurality of colors, and
the second signal line extends along the column direction for each of a plurality of colors with respect to a same pixel, and
the third signal line extends along the column direction for each of a plurality of colors with respect to the same pixel, and is connectable to the second signal line connected to the light emitting elements of the same color through the switch circuit.

4. The display device according to claim 1, wherein
the first signal line is one of a plurality of first signal lines,
the first circuit outputs a signal for driving the pixel,
the first circuit outputs a drive signal for each of the first signal lines to the first signal lines connected to the plurality of pixels belonging to a predetermined region, and
the first circuit outputs a drive signal for each predetermined number of the first signal lines to the first signal lines not connected to the pixels belonging to the predetermined region.

5. The display device according to claim 4, wherein
the first circuit outputs a drive signal for performing doubler driving in the first signal line not connected to a respective pixel belonging to the predetermined region.

6. The display device according to claim 1, wherein
the third circuit does not output a signal for controlling a light emission intensity of another respective pixel to the third signal line not connected to the respective pixel belonging to the predetermined region.

7. The display device according to claim 1, wherein the switch circuit switches connection between one of the second circuit and the third circuit, and the third signal line.

8. The display device according to claim 7, wherein the second circuit is connected to the second signal line and a corresponding third signal line through a same amplifier.

9. An electronic device, comprising:

the display device according to claim 1; and a sensor that acquires a position of a line-of-sight of a person on the display device, wherein the predetermined region is a region including respective pixels corresponding to a direction in which the line-of-sight of a person is directed, and the fourth circuit acquires a position of the predetermined region from an output of the sensor, and selectively switches the switch circuit on a basis of the position of the predetermined region.

10. A display device comprising:

a plurality of pixels arranged in a two-dimensional array of rows and columns, the rows extending along a row direction and the columns extending along a column direction;

a first signal line extending along the row direction and connected to the plurality of pixels belonging to a respective row;

a first circuit connected to the first signal line;

a second signal line extending along a direction of the columns and connected to the plurality of pixels belonging to a respective column;

a second circuit connected to the second signal line;

a third signal line extending along the column direction and connected to the plurality of pixels belonging to another respective column;

a third circuit connected to the third signal line;

a switch circuit configured to switch electrical connections between the second circuit and the third signal line;

a fourth circuit that switches the switch circuit; and a fifth circuit that is connected to the third circuit and performs a comparison of a voltage output from the third circuit with a predetermined voltage, wherein in a first state, the second circuit is connected to the second signal line and is disconnected from the third signal line, in a second state, the second circuit is connected to both the second signal line and the third signal line, the third signal line connected to a respective pixel belonging to a predetermined region is electrically disconnected from the second signal line, the third signal line not connected to a respective pixel belonging to the predetermined region is electrically connected to the second signal line through the switch circuit, the third circuit outputs, to the third signal line connected to the respective pixel belonging to the predetermined region, a signal for controlling light emission intensity of a corresponding pixel of the predetermined voltage or higher, or a first offset voltage, and outputs, to the third signal line not connected to the respective pixel belonging to the predetermined region, a signal lower than the predetermined voltage or a second offset voltage, and the fifth circuit switches the switch circuit on a basis of a result of the comparison to selectively connect the third signal line to the second circuit.

11. The display device according to claim 10, wherein the fifth circuit switches the switch circuit, and electrically disconnects the second signal line and the third signal line in a case where a voltage applied to the third signal line is equal to or higher than a predetermined voltage, and electrically connecting the second circuit and the third signal line directly or through the second signal line in a case where a voltage applied to the third signal line is less than a predetermined voltage.

12. An electronic device, comprising:

the display device according to claim 10; and a sensor that acquires a position of a line-of-sight of a person on the display device, wherein the predetermined region is a region including respective pixels corresponding to a direction in which the line-of-sight of a person is directed, and the third circuit acquires a position of the predetermined region from an output of the sensor, and outputs a signal for controlling light emission intensity of a respective pixel having a voltage equal to or higher than the predetermined voltage or a signal having a voltage lower than the predetermined voltage on a basis of the position of the predetermined region.

* * * * *